US010083551B1

(12) United States Patent
Schmitt et al.

(10) Patent No.: US 10,083,551 B1
(45) Date of Patent: Sep. 25, 2018

(54) AUTOMATIC CRASH DETECTION

(71) Applicant: Allstate Insurance Company, Northbrook, IL (US)

(72) Inventors: Kyle Patrick Schmitt, Chicago, IL (US); Pratheek M. Harish, Chicago, IL (US); Venu Madhav Tammali, Chicago, IL (US); Larry Layne, Chicago, IL (US); Dana Ferguson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/900,958

(22) Filed: Feb. 21, 2018

Related U.S. Application Data

(63) Continuation-in-part of application No. 15/880,187, filed on Jan. 25, 2018, which is a continuation of (Continued)

(51) Int. Cl.

*G06F 19/00* (2018.01)
*G07C 5/00* (2006.01)
*G07C 5/08* (2006.01)

(52) U.S. Cl.

CPC ............ *G07C 5/008* (2013.01); *G07C 5/085* (2013.01)

(58) Field of Classification Search

CPC ... G07C 1/00; G07C 3/00; G07C 3/04; G07C 5/08; G07C 5/085; G07C 5/10; G07C 2209/08; G07C 2209/61

(Continued)

(56) References Cited

U.S. PATENT DOCUMENTS

| | | | |
|---|---|---|---|
| 2,833,495 | A | 5/1958 | Feeney et al. |
| 4,198,864 | A | 4/1980 | Breed |

(Continued)

FOREIGN PATENT DOCUMENTS

| | | | |
|---|---|---|---|
| AU | 2002301438 | B2 | 9/2006 |
| AU | 2007200869 | A1 | 3/2007 |

(Continued)

OTHER PUBLICATIONS

Released—GReddy iPhone and iPod App, Jun. 28, 2010, The Octane Report [On-line], Retrieved from the Internet: http://www.octanereport.com.

(Continued)

*Primary Examiner* — Muhammad Shafi
(74) *Attorney, Agent, or Firm* — Banner & Witcoff, Ltd.

(57) ABSTRACT

Systems and methods are disclosed for determining whether or not a crash involving a vehicle has occurred. A computing device may receive acceleration measurement(s) measured by one or more accelerometers during a time window. The computing device may determine, for one or more acceleration measurements, a corresponding acceleration magnitude. Based on the corresponding acceleration magnitude(s), the computing device may identify, from the acceleration measurement(s), an acceleration measurement and/or may determine whether the acceleration magnitude exceeds a threshold acceleration magnitude. The computing device may corroborate whether a vehicle associated with the mobile computing device was involved in a crash. Data associated with the acceleration magnitude and/or an event, such as a crash event, may be transmitted to a server.

18 Claims, 7 Drawing Sheets

Related U.S. Application Data application No. 15/665,710, filed on Aug. 1, 2017, now Pat. No. 9,916,698, which is a continuation of application No. 14/685,067, filed on Apr. 13, 2015, now Pat. No. 9,767,625.

(58) Field of Classification Search

USPC .... 701/31.5, 121, 30.5, 30.9, 31.1, 301, 302

See application file for complete search history.

(56) References Cited

U.S. PATENT DOCUMENTS 4,716,458 A 12/1987 Heitzman et al.
5,517,183 A 5/1996 Bozeman, Jr.
5,719,554 A 2/1998 Gagnon
5,736,970 A 4/1998 Bozeman, Jr.
5,950,169 A 9/1999 Borghesi et al.
5,963,128 A 10/1999 McClelland
6,023,664 A 2/2000 Bennet
6,060,989 A 5/2000 Gehlot
6,061,610 A 5/2000 Boer
6,076,028 A 6/2000 Donnelly et al.
6,141,611 A 10/2000 Mackey et al.
6,246,933 B1 6/2001 Bague
6,262,657 B1 7/2001 Okuda et al.
6,266,617 B1 7/2001 Evans
6,295,492 B1 9/2001 Lang et al.
6,330,499 B1 12/2001 Chou et al.
6,405,112 B1 6/2002 Rayner
6,438,475 B1 8/2002 Gioutsos et al.
6,472,982 B2 10/2002 Eida et al.
6,509,868 B2 1/2003 Flick
6,539,249 B1 3/2003 Kadhiresan et al.
6,553,308 B1 4/2003 Uhlmann et al.
6,573,831 B2 6/2003 Ikeda et al.
6,594,579 B1 7/2003 Lowrey et al.
6,611,740 B2 8/2003 Lowrey et al.
6,641,038 B2 11/2003 Gehlot et al.
6,642,844 B2 11/2003 Montague
6,701,234 B1 3/2004 Vogelsang
6,732,020 B2 5/2004 Yamagishi
6,732,031 B1 5/2004 Lightner et al.
6,741,168 B2 5/2004 Webb et al.
6,756,887 B2 6/2004 Evans
6,765,499 B2 7/2004 Flick
6,798,356 B2 9/2004 Flick
6,909,947 B2 6/2005 Douros et al.
6,925,425 B2 8/2005 Remboski et al.
6,946,966 B2 9/2005 Koenig
6,982,654 B2 1/2006 Rau et al.
6,988,033 B1 1/2006 Lowrey et al.
7,069,118 B2 6/2006 Coletrane et al.
7,082,359 B2 7/2006 Breed
7,092,803 B2 8/2006 Kapolka et al.
7,099,835 B2 8/2006 Williams, III
7,113,127 B1 9/2006 Banet et al.
7,119,669 B2 10/2006 Lundsgaard et al.
7,129,826 B2 10/2006 Nitz et al.
7,133,611 B2 11/2006 Kaneko
7,135,993 B2 11/2006 Okamoto et al.
7,155,259 B2 12/2006 Bauchot et al.
7,155,321 B2 12/2006 Bromley et al.
7,158,016 B2 1/2007 Cuddihy et al.
7,174,243 B1 2/2007 Lightner et al.
7,271,716 B2 9/2007 Nou
7,305,293 B2 12/2007 Flick
7,323,972 B2 1/2008 Nobusawa
7,323,973 B1 1/2008 Ceglia et al.
7,348,895 B2 3/2008 Lagassey
7,418,400 B1 8/2008 Lorenz
7,477,968 B1 1/2009 Lowrey et al.
7,508,298 B2 3/2009 Pisz et al.
7,565,230 B2 7/2009 Gardner et al.
7,600,426 B2 10/2009 Savolainen et al.
7,624,031 B2 11/2009 Simpson et al.
7,650,235 B2 1/2010 Lee et al.
7,671,727 B2 3/2010 Flick
7,715,961 B1 5/2010 Kargupta
7,747,365 B1 6/2010 Lowrey et al.
7,872,636 B1 1/2011 Gopi et al.
7,908,921 B2 3/2011 Binda et al.
8,000,979 B2 8/2011 Blom
8,014,789 B2 9/2011 Breed
8,019,629 B1 9/2011 Medina, III et al.
8,022,845 B2 9/2011 Zlojutro
8,041,635 B1 10/2011 Garcia et al.
8,069,060 B2 11/2011 Tipirneni
8,090,598 B2 1/2012 Bauer et al.
8,140,358 B1 3/2012 Ling et al.
8,214,100 B2 7/2012 Lowrey et al.
8,229,759 B2 7/2012 Zhu et al.
8,255,275 B2 8/2012 Collopy et al.
8,260,639 B1 9/2012 Medina, III et al.
8,271,187 B2 9/2012 Taylor et al.
8,285,588 B2 10/2012 Postrel
8,311,858 B2 11/2012 Everett et al.
8,321,086 B2 11/2012 Park et al.
8,330,593 B2 12/2012 Golenski
8,370,254 B1 2/2013 Hopkins, III et al.
8,401,877 B2 3/2013 Salvagio
8,403,225 B2 3/2013 Sharra et al.
8,417,604 B2 4/2013 Orr et al.
8,423,239 B2 4/2013 Blumer et al.
8,432,262 B2 4/2013 Talty et al.
8,433,590 B2 4/2013 Prescott
8,438,049 B2 5/2013 Ranicar, III et al.
8,442,508 B2 5/2013 Harter et al.
8,442,797 B2 5/2013 Kim et al.
8,447,459 B2 5/2013 Lowrey et al.
8,452,486 B2 5/2013 Banet et al.
8,463,488 B1 6/2013 Hart
8,466,781 B2 6/2013 Miller et al.
8,478,514 B2 7/2013 Kargupta
8,484,113 B2 7/2013 Collopy et al.
8,494,938 B1 7/2013 Kazenas
8,510,133 B2 8/2013 Peak et al.
8,510,200 B2 8/2013 Pearlman et al.
8,527,135 B2 9/2013 Lowrey et al.
8,571,895 B1 10/2013 Medina, III et al.
8,577,703 B2 11/2013 McClellan et al.
8,581,712 B2 11/2013 Morgan et al.
8,589,015 B2 11/2013 Willis et al.
8,595,034 B2 11/2013 Bauer et al.
8,598,977 B2 12/2013 Maalouf et al.
8,620,692 B2 12/2013 Collopy et al.
8,630,768 B2 1/2014 McClellan et al.
8,633,985 B2 1/2014 Haynes et al.
8,635,091 B2 1/2014 Amigo et al.
8,688,380 B2 4/2014 Cawse et al.
8,712,893 B1 4/2014 Brandmaier et al.
8,751,270 B1 6/2014 Hanson et al.
8,799,034 B1 8/2014 Brandmaier et al.
8,930,581 B2 1/2015 Anton et al.
9,002,719 B2 4/2015 Tofte
9,324,201 B2 * 4/2016 Jun .................... G07C 5/0866
9,361,735 B1 6/2016 Leise
9,767,625 B1 * 9/2017 Snyder .................. G07C 5/008
2002/0003571 A1 1/2002 Schofield et al.
2002/0049535 A1 4/2002 Rigo et al.
2002/0055861 A1 5/2002 King et al.
2002/0111725 A1 8/2002 Burge
2003/0005765 A1 1/2003 Brudis et al.
2003/0233261 A1 12/2003 Kawahara et al.
2004/0000992 A1 1/2004 Cuddihy et al.
2004/0068350 A1 4/2004 Tomson
2004/0083123 A1 4/2004 Kim et al.
2004/0088090 A1 5/2004 Wee
2004/0128065 A1 7/2004 Taylor et al.
2004/0145457 A1 7/2004 Schofield et al.
2004/0186744 A1 9/2004 Lux
2004/0189493 A1 9/2004 Estus et al.
2004/0189722 A1 9/2004 Acres
2004/0205622 A1 10/2004 Jones et al.
2005/0021374 A1 1/2005 Allahyari
2005/0104745 A1 5/2005 Bachelder et al.

(56) References Cited

U.S. PATENT DOCUMENTS

2005/0119826 A1 6/2005 Lee et al.
2005/0161505 A1 7/2005 Yin et al.
2005/0216487 A1 9/2005 Fisher et al.
2005/0278082 A1 12/2005 Weekes
2006/0025897 A1 2/2006 Shostak et al.
2006/0055583 A1 3/2006 Orr et al.
2006/0067573 A1 3/2006 Parr et al.
2006/0192783 A1 8/2006 Kass et al.
2006/0224305 A1 10/2006 Ansari et al.
2006/0226960 A1 10/2006 Pisz et al.
2006/0282202 A1 12/2006 Cashler et al.
2007/0009136 A1 1/2007 Pawlenko et al.
2007/0027583 A1 2/2007 Tamir et al.
2007/0037610 A1 2/2007 Logan
2007/0043594 A1 2/2007 Lavergne
2007/0136162 A1 6/2007 Thibodeau et al.
2007/0162308 A1 7/2007 Peters
2007/0288268 A1 12/2007 Weeks
2008/0027761 A1 1/2008 Bracha
2008/0052134 A1 2/2008 Nowak et al.
2008/0078253 A1 4/2008 Blackwood et al.
2008/0215375 A1 9/2008 Nakano et al.
2008/0242261 A1 10/2008 Shimanuki et al.
2008/0255722 A1 10/2008 McClellan et al.
2008/0294690 A1 11/2008 McClellan et al.
2008/0300731 A1 12/2008 Nakajima et al.
2008/0306636 A1 12/2008 Caspe-Detzer et al.
2008/0306996 A1 12/2008 McClellan et al.
2008/0319665 A1 12/2008 Berkobin et al.
2009/0013755 A1 1/2009 Tsai et al.
2009/0036091 A1 2/2009 Ball et al.
2009/0063174 A1 3/2009 Fricke
2009/0099732 A1 4/2009 Pisz
2009/0106052 A1 4/2009 Moldovan
2009/0125180 A1 5/2009 Berkobin et al.
2009/0164504 A1 6/2009 Flake et al.
2009/0192688 A1 7/2009 Padmanabhan et al.
2009/0198772 A1 8/2009 Kim et al.
2009/0234678 A1 9/2009 Arenas
2009/0248283 A1 10/2009 Bicego, Jr.
2009/0254241 A1 10/2009 Basir
2009/0265385 A1 10/2009 Beland et al.
2010/0020170 A1 1/2010 Higgins-Luthman et al.
2010/0030540 A1 2/2010 Choi et al.
2010/0036595 A1* 2/2010 Coy .................... G08G 1/0104 701/119
2010/0049552 A1 2/2010 Fini et al.
2010/0131300 A1 5/2010 Collopy et al.
2010/0138242 A1 6/2010 Ferrick et al.
2010/0161491 A1 6/2010 Bauchot et al.
2010/0174564 A1 7/2010 Stender et al.
2010/0205012 A1 8/2010 McClellan
2010/0219944 A1 9/2010 McCormick et al.
2010/0250369 A1 9/2010 Peterson et al.
2010/0323657 A1 12/2010 Barnard et al.
2011/0012720 A1 1/2011 Hirschfeld
2011/0060496 A1 3/2011 Nielsen et al.
2011/0070834 A1 3/2011 Griffin et al.
2011/0070864 A1 3/2011 Karam et al.
2011/0077028 A1 3/2011 Wilkes, III et al.
2011/0106449 A1 5/2011 Chowdhary et al.
2011/0118934 A1 5/2011 Lowrey et al.
2011/0153367 A1 6/2011 Amigo et al.
2011/0153369 A1 6/2011 Feldman et al.
2011/0161116 A1 6/2011 Peak et al.
2011/0161118 A1 6/2011 Borden et al.
2011/0161119 A1 6/2011 Collins
2011/0185178 A1 7/2011 Gotthardt
2011/0281564 A1 11/2011 Armitage et al.
2011/0307119 A1 12/2011 Basir et al.
2011/0307188 A1 12/2011 Peng et al.
2012/0028680 A1 2/2012 Breed
2012/0047203 A1 2/2012 Brown et al.
2012/0072243 A1 3/2012 Collins et al.
2012/0076437 A1 3/2012 King
2012/0084179 A1 4/2012 McRae et al.
2012/0109690 A1 5/2012 Weinrauch et al.
2012/0109692 A1 5/2012 Collins et al.
2012/0119936 A1 5/2012 Miller et al.
2012/0136802 A1 5/2012 McQuade et al.
2012/0150412 A1 6/2012 Yoon et al.
2012/0191476 A1 7/2012 Reid et al.
2012/0197486 A1 8/2012 Elliott
2012/0197669 A1 8/2012 Kote et al.
2012/0202551 A1 8/2012 Mirbaha et al.
2012/0209631 A1 8/2012 Roscoe et al.
2012/0209632 A1 8/2012 Kaminski et al.
2012/0230548 A1 9/2012 Calman et al.
2012/0232995 A1 9/2012 Castro et al.
2012/0239417 A1 9/2012 Pourfallah et al.
2012/0242503 A1 9/2012 Thomas et al.
2012/0250938 A1 10/2012 DeHart
2012/0259665 A1 10/2012 Pandhi et al.
2012/0290150 A1 11/2012 Doughty et al.
2012/0303392 A1 11/2012 Depura et al.
2012/0316893 A1 12/2012 Egawa
2012/0330687 A1 12/2012 Hilario et al.
2013/0006674 A1 1/2013 Bowne et al.
2013/0006675 A1 1/2013 Bowne et al.
2013/0018676 A1 1/2013 Fischer et al.
2013/0033386 A1 2/2013 Zlojutro
2013/0035964 A1 2/2013 Roscoe et al.
2013/0046510 A1 2/2013 Bowne et al.
2013/0054274 A1 2/2013 Katyal
2013/0069802 A1 3/2013 Foghel et al.
2013/0073318 A1 3/2013 Feldman et al.
2013/0073321 A1 3/2013 Hofmann et al.
2013/0090881 A1 4/2013 Janardhanan et al.
2013/0138267 A1 5/2013 Hignite et al.
2013/0151288 A1 6/2013 Bowne et al.
2013/0166098 A1 6/2013 Lavie et al.
2013/0166326 A1 6/2013 Lavie et al.
2013/0179027 A1 7/2013 Mitchell
2013/0179198 A1 7/2013 Bowne et al.
2013/0190967 A1 7/2013 Hassib et al.
2013/0197856 A1* 8/2013 Barfield .................. G01P 15/00 702/141
2013/0197945 A1 8/2013 Anderson
2013/0204645 A1 8/2013 Lehman et al.
2013/0211660 A1 8/2013 Mitchell
2013/0226369 A1 8/2013 Yorio et al.
2013/0226397 A1 8/2013 Kuphal et al.
2013/0289819 A1 10/2013 Hassib et al.
2013/0290036 A1 10/2013 Strange
2013/0297097 A1 11/2013 Fischer et al.
2013/0297353 A1 11/2013 Strange et al.
2013/0297418 A1 11/2013 Collopy et al.
2013/0300552 A1 11/2013 Chang
2013/0311209 A1 11/2013 Kaminski et al.
2013/0316310 A1 11/2013 Musicant et al.
2013/0317860 A1 11/2013 Schumann, Jr.
2013/0317865 A1 11/2013 Tofte et al.
2013/0332026 A1 12/2013 McKown et al.
2013/0339062 A1 12/2013 Brewer et al.
2014/0067429 A1 3/2014 Lowell
2014/0081675 A1 3/2014 Ives et al.
2014/0121878 A1 5/2014 Pandhi et al.
2014/0122012 A1 5/2014 Barfield
2014/0132404 A1 5/2014 Katoh et al.
2014/0244312 A1 8/2014 Gray et al.
2014/0244678 A1 8/2014 Zamer et al.
2014/0300739 A1 10/2014 Mimar
2014/0316825 A1 10/2014 van Dijk et al.
2014/0344050 A1 11/2014 McKinley et al.
2015/0006023 A1 1/2015 Fuchs
2015/0019267 A1 1/2015 Prieto et al.
2015/0073834 A1 3/2015 Gurenko et al.
2015/0106133 A1 4/2015 Smith, Jr.
2015/0149218 A1 5/2015 Bayley et al.

(56) References Cited

U.S. PATENT DOCUMENTS

| | | | |
|---|---|---|---|
| 2015/0269791 | A1 | 9/2015 | Amigo et al. |
| 2015/0324924 | A1 | 11/2015 | Wilson et al. |

FOREIGN PATENT DOCUMENTS

| | | | | |
|---|---|---|---|---|
| CA | 2658219 | A1 | | 1/2008 |
| CN | 203025907 | U | | 6/2013 |
| CN | 103390326 | A | | 11/2013 |
| EP | 1488198 | A2 | | 12/2004 |
| EP | 1826734 | A1 | | 8/2007 |
| EP | 1965361 | A2 | | 9/2008 |
| EP | 2147320 | A1 | | 1/2010 |
| EP | 2481037 | A1 | | 8/2012 |
| GB | 2486384 | A | | 6/2012 |
| GB | 2488956 | A | | 9/2012 |
| KR | 2005112932 | | | 5/2004 |
| KR | 2005112932 | | * | 12/2005 |
| WO | 1998047109 | A1 | | 10/1998 |
| WO | 2002079934 | A | | 10/2002 |
| WO | 2012045128 | A1 | | 4/2012 |
| WO | 2012067640 | A1 | | 5/2012 |
| WO | 2012097441 | A1 | | 7/2012 |
| WO | 2012106878 | A1 | | 8/2012 |
| WO | 2012173655 | A1 | | 12/2012 |
| WO | 2012174590 | A1 | | 12/2012 |

OTHER PUBLICATIONS

"Automatic Crash Response, Car Safety, & Emergency Services-OnStar" OnStar, retrieved from <http://www.onstar.onstar.com/web/portal/emergencyexplore?tab=1&g=1> on Jan. 12, 2013.
Barometer-Aided Road Grade Estimation, Jussi Parviainen et al., Tampere University of Technology, Finland; 2009.
Charles Petzold, Accelerometer and Location Service in Windows Phone 7, Nov. 23, 2010 [On-line], Retrieved from the internet: http://www.c-sharpcorner.com/UploadFile/8c85cf/4363/.
"Encrypted QR Codes." qrworld. Nov. 27, 2011. Retrieved from http://qrworld.wordpress.com/2011/11/27/ encrypted-qr-codes on Nov. 12, 2013.
Dash3 Instruction Manual, 2010, Race Technology Limited [On-line], Retrieved from the Internet: http://www.race-technology.com.
Dash4 Pro, 2011, Race Technology Ltd. [On-line], Retrieved from the Internet: http://www.race-technology.com/dash4_pro_2_31014_html.
AX22 Performance Computer, Race Technology Ltd. [On-line], Retrieved from the Internet: http://www.race-technology.com.
"Providing Accident Detection in Vehicular Networks through OBD-II Devices and Android-based Smart Phones." M. Narsing Rao et al., International Journal of Science and Research (ISSN: 2319-7064), vol. 2(9), Sep. 2013.
Fleet Management Features, 2011, RedTail Telematics [On-line], Retrieved from the Internet: http://www.redtailtelematics.com/fleet-management/features/.
"Near Field Communication: A Simple Exchange of Information." Samsung. Mar. 5, 2011 Retrieved from http://www.samsung.com/us/article/near-field-communication-a-simple-exchange-of-information on May 21, 2011.
"License Plate Scanner Obsoletes Meter Maid." Bertel Schmitt, The Truth About Cars. Feb. 1, 2011. Retrieved from http://www.thetruthaboutcars.com/2011/02/license-plate-scanner-obsoletes-meter-maid on Jun. 28, 2013.
"Car insurance firms revving up mobile app features." Mark Chalon Smith, Insurance.com, Feb. 6, 2012. Retrieved from http://www.insurance.com/auto-insurance/auto-insurance-basics/car-insurance-mobile-apps.html on Jun. 28, 2013.
"Snooper UK Store—Buy Direct from the Manufacturer." Snooper, retrieved from <http://snooper.uk/products/snooper-lynx-app/index.html> on Apr. 15, 2015.
Spevacek, C. E., Ledwith, J. F., Newman, T. R., & Lennes, John B.,Jr. (2001). Additional insured and indemnification issues affecting the insurance industry, coverage counsel, and defense counsel—legal advice and practice pointers. FDCC Quarterly, 52(1), 3-101. Retrieved from <http://search.proquest.com/docview/201215466?accountid=14753>.
"Vehicle Wrap Trends: What are QR Codes and why do I need one?" Sunrise Signs. Retrieved from http://www.sunrisesigns.com/our-blog/bid/34661/Vehicle-Wrap-Trends-What-are-QR-Codes-and-why-do-I-need-one on May 21, 2013.
"Using Smartphones to Detect Car Accidents and Provide Situational Awareness to First Responders." Christopher Thompson, Institute for Software Integrated Systems, Vanderbilt University; presented at the Third International ICST Conference on Mobile Wireless MiddleWARE, Operating Systems, and Applications; retrieved Dec. 22, 2014.
"Using Smartphones and Wireless Mobile Sensor Networks to Detect Car Accidents and Provide Situational Awareness to Emergency Responders." Christopher Thompson et al., Vanderbilt University; retrieved Dec. 22, 2014.
Verma, M., R. Lange, and D. McGarry. "A Study of US Crash Statistics from Automated Notification Data." In 20th international technical conference on the enhanced safety of vehicles conference (ESV). Lyon, France, pp. 18-21. 2007.
Insurance, 2011, Webtech Wireless [On-line], Retrieved from the Internet: http://www.wtwmail.com/en/industry_solutions/insurance/.
"Top 10 Technology Trends Impacting Life and PC Insurers in 2013." Juergen Weiss et al., Gartner. Mar. 27, 2013.
"WreckWatch: Automatic Traffic Accident Detection and Notification with Smartphones." J. White et al., Journal of Mobile Networks and Applications manuscript, retrieved Apr. 15, 2015.
"Insurance Tech Trends 2013: Elements of postdigital." Mark White et al., Deloitte Development LLC. 2013.
"Bump (application)." Wikipedia. Retrieved from http://en.wikipedia.org/wiki/Bump_(application) on Aug. 29, 2013.
CS-525H: Immersive Human-Computer Interaction, Oct. 25, 2010, Department of Computer Science, Worcester Polytechnic Institute.
GForce, 2011 [On-line], Retrieved from the Internet: http://gadgitech.com/uk/IPhone/Applications/GForce.html.
gMeter, 2008 [On-line], Retrieved from the Internet: http://hunter.pairsite.com/gmeter/.
iHUD an Aerospace inspired spatial motion visualization on the iPhone 3G and 3GS, and iPad [On-line], [attached copy retrieved on Apr. 14, 2011], Retrieved from the Internet: http://www.i-hud.com/.
K.A.T. Matrix 3-Axis Accelerometer (Car Performance Meter), 2011 [On-line], Retrieved from the Internet: http://www.amazon.com.
Race Technology Knowledge Base, 2008 [On-line], Retrieved from the Internet: http://www.race-technology.com/wiki/index.php/AnalysisTools.
Apr. 13, 2015 U.S. Appl. No. 14/685,067.
"Introducing the Octagon Insurance Claims App," retrieved Jun. 3, 2016 from http://www.octagoninsurance.com/insurance-claim/octagon-insurance-mobile-claims-app., 3 pages.
"Insurance Claim Manager App," retrieved Jun. 3, 2016, from https://www.snappii.com/resource-center/snappii-insurance-claims-manager-app/, 4 pages.
"Liberty Mutual Mobile App: Connecting you to Liberty Mutual on the go," retrieved Jun. 3, 2016 from https://www.libertymutual.com/liberty-mutual-mobile/mobile-app, 4 pages.
"Vehicle Damage Claims," retrieved from Jun. 3, 2016 from https://www.statefarm.com/claims/resources/auto/vehicle-damage, 2 pages.
"Taking Advantage of the Pre-Claim Assistance Provision in your Professional Liability Policy," retrieved Jun. 3, 2016 from http://www.sugarmanlaw.com/News-Articles/ID/33/Taking-Advantage-of-the-Pre-Claim-Assistance-Provision_in_your-Professional_Liability_Policy, 2 pages.
"Financial Rights Legal Centre: Making a Claim on Your Car Insurance," retrieved from www. financialrights.org.au, 8 pages.
"When to File a Car Insurance Claim—and When Not to," retrieved Jun. 3, 2016 from https://www.nerdwallet.com/blog/insurance/when-to-file-car-insurance-claims/, 6 pages.
Nov. 30, 2017—(WO) International Search Report—PCT/US17/52199.

(56) References Cited

OTHER PUBLICATIONS

Vehicle productivity, security & safety, 2010, Acadian Companies [On-line], Retrieved from the Internet: http://www.acadian.com/site598.php.
Bubble Level, 2010, Apple Inc. [On-line], Retrieved from the Internet: http://developer.apple.com/library/ios/samplecode/BubbleLevel/Listings/ReadMe_txt.html.
"Information-Sharing in Out-of-Hospital Disaster Response: The Future Role of Information Technology." Jeffrey L. Arnold et al., Abstracts of Prehospital and Disaster Medicine. Retrieved from http://journals.cambridge.org/action/displayAbstract?fromPage=online&aid=8231246 on May 20, 2013.
"Automated Collision Notification (ACN) Field Operational Test (FOT) Evaluation Report." L.R. Bachman et al., NHTSA. Feb. 2001.
Vehicle Performance Computer Owner's Manual, 2011. Beltronics [On-line], Retrieved from the Internet: http://www.beltronics.com.
"Scan Someone's License Plate and Message Them Instantly with New Bump App." Rebecca Boyle, Popular Science, Sep. 17, 2010. Retrieved from http://www.popsci.com/cars/article/2010-09/social-networking-site-uses-license-plates-connect-drivers on Jun. 28, 2013.
DynoStorm, 2009, BunsenTech, LLC [On-line], Retrieved from the Internet: http://www.bunsentech.com/projects/dynostorm/.
"License plate readers allow police to quickly scan, check for offenders." Ann Marie Bush, The Capital-Journal, Mar. 17, 2013, Retrieved from http://cjonline.com/news/2013-03-17/license-plate-readers-allow-police-quickly-scan-check-offenders on Jun. 28, 2013.
Solution: Fleet Performance, 2009, Cadec Global Inc. [On-line], Retrieved from the Internet: http://www.cadec.com/solutions/executiveDashboards.php.
"Trends 2013—North American Insurance eBusiness and Channel Strategy." Ellen Carney, Forrester. May 16, 2013.
"SmoothDrive app", CelluDrive Ltd., May 11, 2011, <http://www.celludrive.com/ptasite/home.htm>.
"Automatic Crash Notification." ComCARE Alliance. Retrieved from <http://www.nhtsa.gov/DOT/NHTSA/NRD/Articles/ERD/PDF/Research/COMCARE_ACN_System.pdf> on Nov. 12, 2013.
"Course Notebook." Jeremy S. Daily, ME 4024: Machine Dynamics, University of Tulsa; Spring 2013.
Rev User Manual, Nov. 9, 2009, DevToaster, LLC [On-line], Retrieved from the Internet: http://www.devtoaster.com
"The Automated Collision Notification System." Bruce R. Donnelly et al., NHTSA. Retrieved from <http://nhtsa.gov/DOT/NHTSA/NRD/Articles/EDR/PDF/Research/Automated_Collision_Notification_System_PDF> on Nov. 12, 2013.
DragTimes.com Density Altitude, DragTimes, Sep. 1, 2013 <https://play.google.com/store/apps/details?id=com. DragTimes&feature=search_result>.
"The driving quality app: Product Description." DriSMo, retrieved from <http://hovedprosjekter.hig.no/v2011/imt/in/drismo/index.php?option=com_content&view=article&id=5&Itemid=3> on Apr. 15, 2015.
"Fraunhofer offers secure NFC keys that can be shared via QR codes." Karl Dryer, NFC World. Mar. 20, 2013. Retrieved from http://www.nfcworld.com/2013/03/20/323184/fraunhofer-offers-secure-nfc-keys-that-can-be-shared-via-qr-codes on Nov. 13, 2013.
Carl Duzen, et al., Using an Accelerometer to Classify Motion, CAPE inc, 2001.
Everywhere Navigation: Integrated Solutions on Consumer Mobile Devices, Naser El-Sheimy et al., Inside GNSS, pp. 74-82, Oct. 2011.
"This App Turns Smartphones Into Safe Driving Tools." Kate Freeman, Mashable. Aug. 30, 2012. Retrieved from <http://mashable.com/2012/08/30/drivescribe-app-safe-driving> on Nov. 12, 2013.
"Automated Collision Notification (ACN) Field Operational Test-Final Report (FOT)." D. Funke et al., NHTSA. Oct. 31, 2000.
"Geico App—Android Apps on Google Play." Geico. Retrieved from <http://play.google.com/store/apps/details?id=com.geico.mobile&hl=en> Nov. 12, 2013.
Your Resource Highway to driver Safety, 2011, GeoPoint Partners, LLC [On-line], Retrieved from the Internet: http://www.geopointpartners.com/.
"Automatic License Plate Recognition (ALPR) Scanning Systems." Experienced Criminal Lawyers, Get Lawyer Leads, Inc., Retrieved from http://www.experiencedcriminallawyers.com/articles/automatic-license-plate-recognition-alpr-scanning-systems on Jun. 28, 2013.
Giuseppe Ghiani, et al., Multimodal PDA Interfaces to Assist Drivers in Monitoring Their Vehicles, ISTI-CNR.
"Safe Driving and Accidental Monitoring Using GPS System and Three Axis Accelerometer." R. Goregaonkar et al., International Journal of Emerging Technology and Advanced Engineering, vol. 3(11), Nov. 2013.
"New Technology Security Risks : QR codes and Near Field Communication." Charlotte Gray. Retrieved from http://www.qwiktag.com/index.php/knowledge-base/150-technology-security-risks-qr-codes on Nov. 13, 2013.
"g-tac." Liberty for One, retrieved from <http://apps.libertyforone.com/g-tac/> on Jun. 17, 2015.
Technical Plan, Harker Innovation Team [On-line], Retrieved from the Internet: http://fuelourfuturenow.discoveryeducation.com/pdfs/dash-plus/Harker_Plan.pdf.
Allen Hong, The Linear-Logic ScanGauge II Review, Jun. 10, 2007.
Car Accelerometer details, 2011, Hurtado Apps—iPhone/iPod applications [On-line], Retrieved from the Internet: http://apps.hurtado.cl/car/car-details.
"Fall Detection with Three-Axis Accelerometer and Magnetometer in a Smartphone." Soo-Young Hwang et al., National University, Korea, retrieved on Apr. 15, 2015.
"QR Code." IDL Services. Retrieved from http://www.internationaler-fuehrerschein.com/en/the-idd/qr-code-quick-response-code-feature-in-the-idd.html on May 21, 2013.
"Speed-Breaker Early Warning System." Mohit Jain et al., retrieved on Apr. 15, 2015.
"Design and implementation of a smart card based healthcare information system." Geylani Kardas et al., Computer Methods and Programs in Biomedicine 81. pp. 66-78. Sep. 27, 2003.
"Design and Development of a GSM Based Vehicle Theft Control System and Accident Detection by Wireless Sensor Network." V.B.Gopala Krishna et al., International Journal of Emerging Trends in Engineering and Development, Issue 2, vol. 5, pp. 529-540. Jul. 2012.
"The Potential for Automatic Crash Notification Systems to Reduce Road Fatalities." Julie A. Lahausse et al., Annals of Advances in Automotive Medicine, vol. 52, pp. 85-92. 2008. (retrieved from http://www.ncbi.nlm.nih.gov/pmc/articles/PMC3256762/ on Jan. 12, 2013).
"Portable Automatic Conjecturing and Announcing System for Real-Time Accident Detection." C.F. Lai et al., International Journal on Smart Sensing and Intelligent Systems, vol. 2(9), Jun. 2009.
"Privacy Policy." Lemon Wallet. Retrieved from http://lemon.com/privacy on May 20, 2013.
Vitalijs Lennojs, aGile Dashboard, Dec. 19, 2008 [On-line], Retrieved from the Internet: http://phoneapplicationlist.com/app/id300133977/.
What Can You Do With a Barometer, Joe Levi, Pocketnow, Oct. 19, 2011, <http://pocketnow.com/android/what-can-you-do-with-a-barometer-on-a-smartphone>.
Maciag, A. K. (1980). Motor accident insurance and systems of compensation. (Order No. MK49023, University of Alberta (Canada)). ProQuest Dissertations and Theses, 1. Retrieved from <http://search.proquest.com/docview/303097892?accountid=14753>. (303097892).
"New Idea: QR Codes for License Plates." Andrew Maxwell, Heka Interactive. Feb. 11, 2011. Retrieved from http://www.andrewcmaxwell.com/2011/02/new-idea-qr-codes-for-license-plates on May 21, 2013.
Glossary III: Rise of the Smartphonesa, Scott McCormick, May 12, 2011 <http://floatlearning.com/2011/05/glossary-iii-rise-of-the-smartphones/>.
"Mercedes-Benz mbrace™." Mercedes-Benz, Oct. 22, 2010.
"Microsoft Tag Implementation Guide: Practical requirements and recommendations to ensure successful Tag production." Microsoft Tag. Aug. 2010.

(56) References Cited

OTHER PUBLICATIONS

"Nericell: Rich Monitoring of Road and Traffic Conditions using Mobile Smartphones." Prashanth Mohan et al., Microsoft Research India, Bangalore, ACM, 2008.
"For insurance companies, the day of digital reckoning." Henrik Naujoks et al., Bain & Company. 2013.
Doug Newcomb, Cool iPhone Car Applications, Nov. 20, 2008 [On-line], Retrieved from the Internet: http://edmunds.com.

* cited by examiner

AUTOMATIC CRASH DETECTION

CROSS-REFERENCE TO RELATED APPLICATIONS

This application is a continuation-in-part of pending U.S. patent application Ser. No. 15/880,187, filed Jan. 25, 2018 and entitled "Automatic Crash Detection," which is a continuation of pending U.S. patent application Ser. No. 15/665,710, filed Aug. 1, 2017 and entitled "Automatic Crash Detection," which is a continuation of U.S. patent application Ser. No. 14/685,067 (now U.S. Pat. No. 9,767,625), filed Apr. 13, 2015 and entitled "Automatic Crash Detection." Each of the prior applications is incorporated herein by reference in its entirety.

TECHNICAL FIELD

Aspects of the disclosure generally relate to the detection of vehicle crashes using sensors and computing devices, which may be integrated into mobile devices.

BACKGROUND

Typically, drivers of vehicles involved in crashes (or in some cases, emergency personnel) report crashes to insurance providers days or even weeks after the crash. The delay in reporting crashes often results in a delay in processing insurance claims. The information that the driver gives to his or her insurance provider after the fact might also be incomplete or vague. For example, the driver might have forgotten the location of the accident.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices, such as a mobile computing device comprising an accelerometer configured to measure acceleration of at least one axis of the accelerometer, communication circuitry configured to wirelessly communicate with other devices, a processor, and/or memory. The memory may store computer-executable instructions that, when executed by the processor, cause the processor of the mobile computing device to receive, from the accelerometer, a plurality of acceleration measurements measured by the accelerometer during a time window comprising a predetermined duration. The processor may determine, for each acceleration measurement of the plurality of acceleration measurements, a corresponding acceleration magnitude. The processor may identify, from the plurality of acceleration measurements, an acceleration measurement having an acceleration magnitude that satisfies a metric. The identification may be based on the corresponding acceleration magnitude for each acceleration measurement of the plurality of acceleration measurements. The processor may determine whether the acceleration magnitude exceeds a threshold acceleration magnitude. After determining that the acceleration magnitude exceeds the threshold acceleration magnitude, the processor may corroborate, based on sensor measurements different from the plurality of acceleration measurements, whether a vehicle associated with the mobile computing device was involved in a crash. The processor may transmit, via the communication circuitry and to a server, data indicative of the acceleration magnitude and data indicative of the sensor measurements.

In some aspects, the time window may overlap a previous time window by a predetermined amount of time. Each corresponding acceleration magnitude may be determined based on a sum of squares of acceleration measurements for three axes of the accelerometer.

In some aspects, a metric (e.g., a criterion) may comprise a predetermined percentile, and identifying the acceleration measurement having the acceleration magnitude that satisfies the metric may comprise identifying, from the plurality of acceleration measurements, the acceleration measurement having a minimum acceleration magnitude in the predetermined percentile for the plurality of acceleration measurements.

In some aspects, the sensor measurements may comprise deceleration data, and corroborating whether the vehicle was involved in a crash may comprise determining whether a deceleration value calculated from the deceleration data exceeds a threshold deceleration. The sensor measurements may additionally or alternatively comprise location data, and corroborating whether the vehicle was involved in a crash may comprise determining, based on the location data, whether a distance the vehicle traveled during one or more additional time windows after the time window exceeds a threshold distance.

In some aspects, the memory may store computer-executable instructions that, when executed by the processor, cause the processor of the mobile computing device to, based on sensor data, determine a confidence value associated with whether the vehicle was involved in a crash. The sensor data may comprise the acceleration magnitude of the identified acceleration measurement. The confidence value may be determined based on the acceleration magnitude of the identified acceleration measurement and based on one or more of a deceleration value associated with the vehicle or a distance the vehicle traveled.

In some aspects, determining, for each acceleration measurement of the plurality of acceleration measurements, the corresponding acceleration magnitude may be performed in response to one or more of a determination that a speed associated with the vehicle is above a first threshold speed or a determination that the speed associated with the vehicle is below a second threshold speed.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
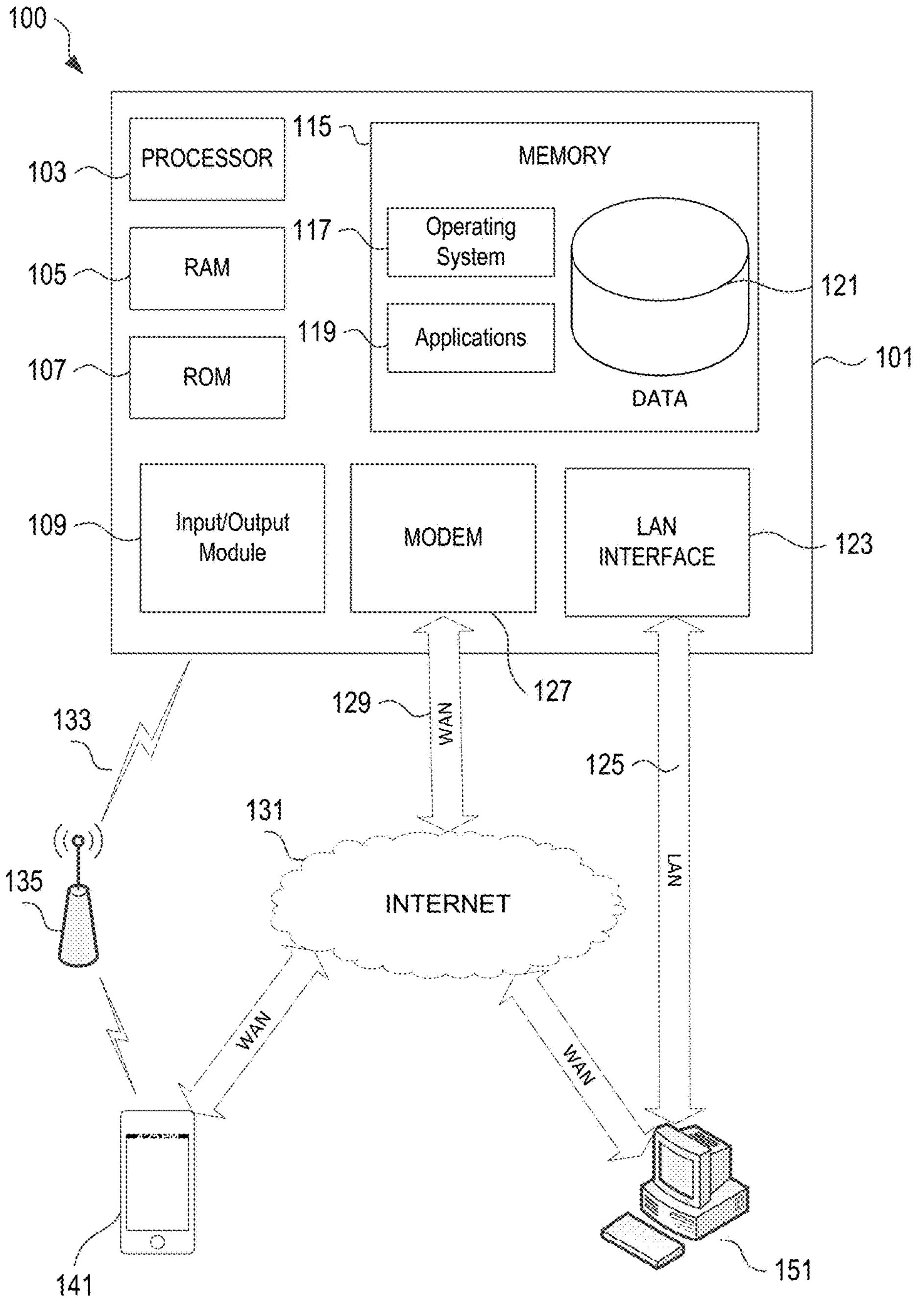
FIG. 1 illustrates a network environment and computing systems that may be used to implement aspects of the disclosure.

FIG. 1 illustrates a block diagram of a computing device 101 in a crash detection system 100 that may be used according to one or more illustrative embodiments of the disclosure. The crash detection computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as crash detection computing devices or systems, configured as described herein for transmitting and receiving sensor data, detecting a crash, and confirming that the crash (rather than a non-crash event) occurred. Sensor data can include data collected from mobile devices (e.g., the driver's mobile phone), vehicle sensors, and/or on-board diagnostic (OBD) systems.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the crash detection computing device 101 to execute a series of computer-readable instructions to transmit or receive sensor data, process sensor data, and determine or confirm crash and non-crash events from the sensor data.

The crash detection computing device 101 may operate in a networked environment 100 supporting connections to one or more remote computers, such as terminals/devices 141 and 151. Crash detection computing device 101, and related terminals/devices 141 and 151, may include devices installed in vehicles, mobile devices that may travel within vehicles, or devices outside of vehicles that are configured to receive and process vehicle and other sensor data. Thus, the crash detection computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensor and telematics devices), or mobile communication devices (e.g., mobile phones, portable computing devices, and the like), and may include some or all of the elements described above with respect to the crash detection computing device 101. The network connections depicted in FIG. 1 include a local area network (LAN) 125 and a wide area network (WAN) 129, and a wireless telecommunications network 133, but may also include other networks. When used in a LAN networking environment, the crash detection computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and crash detection system components described herein may be configured to communicate using any of these network protocols or technologies.

Additionally, one or more application programs 119 used by the crash detection computing device 101 may include computer executable instructions (e.g., sensor data analysis programs, crash detection algorithms, and the like) for transmitting and receiving sensor and crash data and performing other related functions as described herein.

Sensor data may refer to information pertaining to one or more actions or events performed by a vehicle and can include aspects of information identified or determined from data collected from a vehicle or mobile device. Sensor data can include, for example, location data, speed or velocity data, acceleration data, presence data, time data, direction data, mobile device orientation data, rotation/gyroscopic data, and the like.

Figure 2:
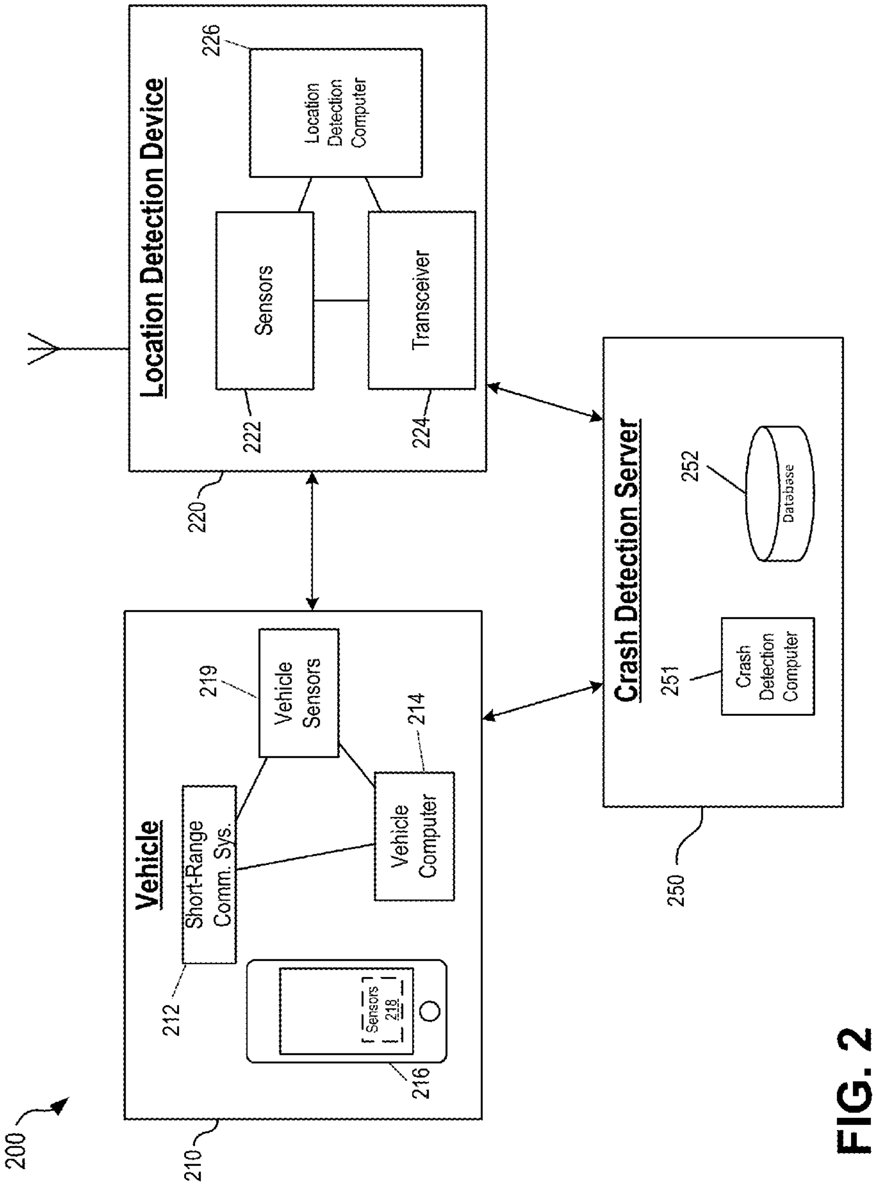
FIG. 2 is a diagram illustrating various example components of a crash detection system according to one or more aspects of the disclosure.

FIG. 2 is a diagram illustrating various example components of a crash detection system 200 according to one or more aspects of the disclosure. The crash detection system 200 may include a vehicle 210, other vehicles (not illustrated), a location detection system 220, a crash detection server 250, and additional related components. Each component shown in FIG. 2 may be implemented in hardware, software, or a combination of the two. Additionally, each component of the crash detection system 200 may include a computing device (or system) having some or all of the structural components described above for computing device 101.

Vehicle 210 may be, for example, an automobile, motorcycle, scooter, bus, recreational vehicle, boat, or other vehicle for which sensor or crash data may be collected and analyzed. A mobile computing device 216 within the vehicle 210 may be used to collect sensor or crash data (e.g., via sensors 218) and/or to receive sensor or crash data from the vehicle 210 (e.g., via vehicle sensors 219). The mobile device 216 may process the data to detect a crash or non-crash event and/or transmit the sensor or crash data to the crash detection server 250 or other external computing devices. Mobile computing device 216 may be, for example, mobile phones, personal digital assistants (PDAs), tablet computers, laptop computers, smartwatches, and other devices that may be carried by drivers or passengers inside or outside of the vehicle 210. The mobile computing device 216 may contain some or all of the hardware/software components as the computing device 101 depicted in FIG. 1. Software applications executing on the mobile device 216 may be configured to receive sensor data from sensors 218, such as acceleration, velocity, location, and the like and/or communicate with vehicle sensors 219 or other vehicle communication systems to sense or receive driving data. For example, mobile device 216 equipped with Global Positioning System (GPS) functionality may determine vehicle location, speed, direction and other basic driving data without needing to communicate with vehicle sensors or external vehicle systems. In other examples, software on the mobile device 216 may be configured to receive some or all of the sensed data collected by sensors 219 of the vehicle 210.

When mobile computing device 216 within the vehicle 210 is used to sense vehicle data, the mobile computing device 216 may store, analyze, and/or transmit the vehicle data to one or more other computing devices. For example, mobile device 216 may transmit vehicle data directly to crash detection server 250, and thus may be used instead of sensors or communication systems of the vehicle 210.

The mobile device 216 may include various sensors 218 capable of detecting and recording conditions at and operational parameters of the vehicle 210 if the mobile device 216 is inside the vehicle. The sensors 218 may be used to sense, for example, the location of the mobile device 216, such as the GPS coordinates (e.g., latitude and longitude). The location of the mobile device 216 may also be determined based on wireless networks the mobile device has connected to, such as Wi-Fi networks, cellular networks, and the like. Images taken by a camera of the mobile device 216 may also be used to determine the location. For example, the mobile device may capture an image before, during, or after the accidents, and the captured image may be compared to images stored in one or more databases (e.g., databases of a search engine). Once a match is found, the location of the mobile device 216 may be determined based on the tagged location of the matching image in the database. In some aspects, location may be detected, for example, at least once per second (e.g., 60 Hz).

The sensors 218 of the mobile device 216, such as a GPS and/or a compass, may sense the speed and/or direction at which the mobile device 216 (and accordingly vehicle 210) is traveling. An accelerometer of the mobile device 216 may sense the acceleration of the mobile device. A gyroscope may be used to determine the orientation of the mobile device. In some aspects, orientation may be detected, for example, at a rate of 90 Hz. The gyroscope may also be used to measure the speed of rotation of the mobile device 216. A magnetometer may be used to measure the strength and direction of the magnetic field relative to the mobile device. The sensors 218 previously described are exemplary, and the mobile device 216 may include any other sensors used for crash detection.

The data collected by the mobile device 216 may be stored and/or analyzed within the mobile device 216. The processing components of the mobile computing device 216 may be used to analyze sensor data, determine that a crash has or has not occurred, and confirm whether or not the crash has occurred. Additionally or alternatively, the mobile device 216 may transmit, via a wired or wireless transmission network, the data to one or more external devices for storage or analysis, such as vehicle computer 214 or crash detection server 250. In other words, mobile computing device 216 may be used in conjunction with, or in place of, the vehicle computer 214 or crash detection server 250 to detect crashes.

The vehicle computer 214 of the vehicle 210 may contain some or all of the hardware/software components as the computing device 101 depicted in FIG. 1. The vehicle computer 214 may receive sensor or crash data from the mobile device 216 and/or from sensors 219 built into the vehicle 210. For example, vehicle computer 214 may receive accelerometer data from the mobile device 216 or an accelerometer in the vehicle 210 and use the accelerometer data to determine whether or not a crash has occurred. Additionally or alternatively, the vehicle computer 214 may act as a gateway device between the mobile device 216 and the crash detection server 250. For example, the vehicle computer 214 may receive sensor data (or data indicating that a crash has occurred) from the mobile device 216 and forward the received data to the crash detection server 250. The vehicle 210 may include a short-range communication system 212, which will be described in further detail below.

The system 200 may include a crash detection server 250, containing some or all of the hardware/software components as the computing device 101 depicted in FIG. 1. The crash detection server 250 may include hardware, software, and network components to receive data from one or more vehicles 210 (e.g., via vehicle computer 214), mobile device 216, and other data sources. The crash detection server 250 may include a driving and driver data database 252 and crash detection computer 251 to respectively store and analyze data received from vehicles, mobile devices, and other data sources. The crash detection server 250 may initiate communication with and/or retrieve data from vehicle 210 wirelessly via vehicle computer 214, mobile device 216, or by way of separate computing systems over one or more computer networks (e.g., the Internet). Additionally, the crash detection server 250 may receive additional data from other non-vehicle or mobile device data sources, such as external databases containing driver information (e.g., the driver's name, license number, home or work address, and the like) and vehicle information (e.g., Vehicle Identification Number (VIN), license plate number, vehicle make and model, and the like).

The crash detection computer 251 may be configured to retrieve data from the database 252, or may receive driving data directly from vehicle 210, mobile device 216, or other data sources. The crash detection computer 251 may perform crash detection analyses and other related functions, as will be described in further detail in the examples below. The analyses described herein may be performed entirely in the crash detection computer 251 of the crash detection server 250, entirely in the vehicle computer 214, or entirely in the mobile device 216. In other examples, certain analyses may be performed by vehicle computer 214, other analyses may be performed by the crash detection computer 251, and yet other analyses may be performed by the mobile device 216.

The system 200 may also include an external location detection device 220, containing some or all of the hardware/software components as the computing device 101 depicted in FIG. 1. The location detection device 220 may be used to determine the location of the mobile device 216 and/or vehicle 210. The location detection device 220 may include one or more location sensors 222, transceivers 224 for transmitting and receiving data, and a location detection computer 226 used to process data and determine the location of the mobile device 216 and/or vehicle 210. In some aspects, the location of the mobile device 216 may be determined using GPS, and the location detection device 220 may comprise one or more GPS satellites. Location may also be determined using one or more Wi-Fi network, and the location detection device 220 may comprise one or more Wi-Fi access points. Location may also be determined using one or more cellular network, and the location detection device 220 may comprise one or more cellular network towers. Location may also be determined using captured images, and the location detection device 220 may comprise an on-road camera.

In some aspects, the location of the mobile device 216 and/or vehicle 210 may be determined using another mobile device and/or vehicle. For example, vehicle 210 may be configured to perform vehicle-to-vehicle (V2V) communications, by establishing connections and transmitting/receiving vehicle data to and from other nearby vehicles using short-range communication system 212.

Short-range communication system 212 is a vehicle-based data transmission system configured to transmit vehicle data to other nearby vehicles, and to receive vehicle data from other nearby vehicles. In some examples, communication system 212 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the short-range communication system 212 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The V2V transmissions between the short-range communication system 212 and another vehicle's communication system may be sent via DSRC, Bluetooth, satellite, GSM infrared, IEEE 802.11, WiMAX, RFID, and/or any suitable wireless communication media, standards, and protocols. In certain systems, the short-range communication system 212 may include specialized hardware installed in vehicle 210 (e.g., transceivers, antennas, etc.), while in other examples the communication system 212 may be implemented using existing vehicle hardware components (e.g., radio and satellite equipment, navigation computers) or may be implemented by software running on the mobile device 216 of drivers and passengers within the vehicle 210.

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle data to the other vehicles and/or devices.

The types of vehicle data transmitted by the vehicle 210 may depend on the protocols and standards used for the V2V communication, the range of communications, whether a crash has been detected, and other factors. In certain examples, the vehicle 210 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 210 internal systems that the vehicle is skidding, that an impact has occurred, or that the vehicle's airbags have been deployed, also may be transmitted in V2V communications.

The mobile computing device 216 may be used instead of, or in conjunction with, short-range communication system 212. For example, the mobile device 216 may communicate directly with the other vehicle or directly with another mobile device, which may be inside or outside of the other vehicle. Additionally or alternatively, the other vehicle may communicate location information to vehicle 210, and vehicle 210 may in turn communicate this location information to the mobile device 216. Any data collected by any vehicle sensor or mobile device 216 sensor may be transmitted via V2V or other communication to other nearby vehicles, mobile devices, or infrastructure devices receiving V2V communications from communication system 212 or communications directly from mobile device 216. Further, additional vehicle driving data not from the vehicle's sensors (e.g., vehicle make/model/year information, driver information, etc.) may be collected from other data sources, such as a driver's or passenger's mobile device 216, crash detection server 250, and/or another external computer system, and transmitted using V2V communications to nearby vehicles and other transmitting and receiving devices using communication system 212.

Systems and methods described herein may detect vehicle crashes (e.g., accidents) based on the number of high magnitude accelerometer readings within a particular time window. For example, a computing device 101 may receive five samples of accelerometer readings made within a time window. The computing device 101 may determine that a crash has occurred if the magnitude of three or more of the accelerometer readings is greater than a threshold. Otherwise, the computing device 101 may determine that a non-crash event occurred, such as the mobile device 216 being dropped or a hard braking event of the vehicle 210. The previous description is merely exemplary, and additional examples of the crash detection system 200 and method performed by the system are described below.

Figure 3:
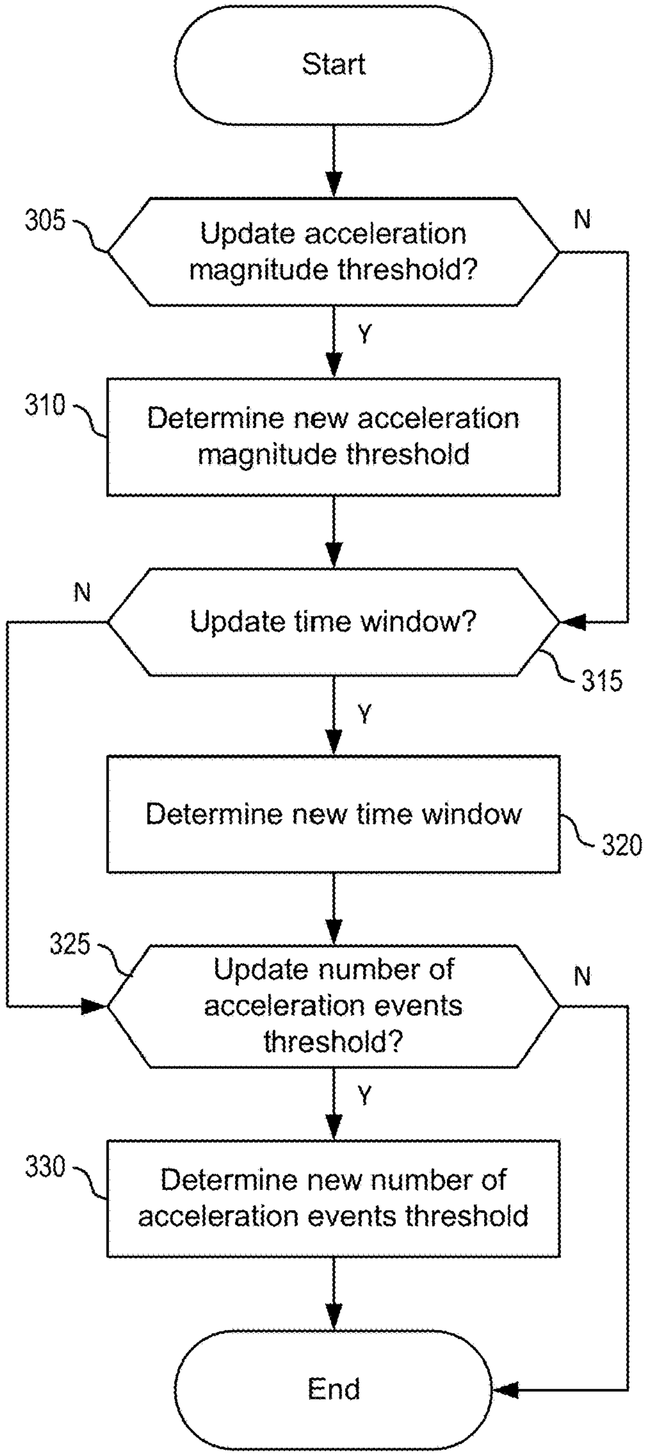
FIG. 3 is a flow diagram illustrating an example method of initializing a crash detection system according to one or more aspects of the disclosure.

FIG. 3 is a flow diagram illustrating an example method of initializing a crash detection system according to one or more aspects of the disclosure. As will be described below, various parameters, such as the acceleration magnitude threshold, the time window, and/or the number of acceleration events threshold may be updated in order to improve the accuracy of the crash detection algorithm described herein. The updates may be based on an analysis of crash and non-crash data collected from a plurality of mobile devices and/or from a plurality of vehicles and used to improve the crash detection algorithm (e.g., to yield better results through data analysis). The example of FIG. 3 may be performed by one or more computing devices in a crash detection system 200, such as vehicle computer 214, a crash detection computer 251, a mobile computing device 216, and/or other computer systems.

In step 305, a computing device, such as the crash detection server 250 or mobile device 216, may determine whether to update an acceleration magnitude threshold. The acceleration magnitude threshold may be used alone or in combination with the number of high acceleration events within a time window to determine whether a crash has occurred. As will be described in further detail in the examples below, a computing device may use the acceleration magnitude threshold to distinguish between a crash event (e.g., magnitude of acceleration exceeding the threshold) and a hard braking event (e.g., magnitude of acceleration not exceeding the threshold).

The magnitude and direction of acceleration may be measured by, for example, an accelerometer of the mobile device 216 and/or vehicle 210. The accelerometer may include three different axes (i.e., x-axis, y-axis, and z-axis), and acceleration measurements may be taken for each axis. The magnitude of acceleration for the purposes of crash detection may be determined using any number of methods. For example, the magnitude of acceleration may be determined based on the sum of the absolute values of all three axes of the accelerometer, as illustrated in the following algorithm:

$$|x|+|y|+|z|$$

The computing device may add an offset to the axis corresponding to the direction of gravity in order to account for the effect of gravity on acceleration measurements. For example, if the direction of gravity corresponds to the z axis, and acceleration is measured using the standard gravity unit of measurement (G or 9.8 $m/s^2$), the following algorithm may be used to determine the magnitude of acceleration for the purposes of crash detection:

$$|x|+|y|+|z+1|$$

Alternatively, if the orientation of the mobile device 216 is unknown, a high-pass filter may be used to remove the effect of gravity. The magnitude of acceleration may alternatively be determined based on the sum of the squares of all three axes of the accelerometer, as illustrated in the following algorithm:

$$x^2+y^2+z^2$$

The computing device may add an offset to the axis corresponding to the direction of gravity, such as the z-axis, as illustrated in the following algorithm:

$$x^2+y^2+(z+1)^2$$

In some aspects, the magnitude of acceleration may be determined using the magnitude of a single axis of the accelerometer. If a single axis is used, the computing device may choose the axis to measure based on the orientation of the mobile device 216. For example, the gyroscope and compass of the mobile device 216 may be used to determine the orientation of mobile device, such as by determining the direction of the force of gravity. The orientation of the mobile device may be fixed by a cradle attached to the vehicle 210 (e.g., the windshield or dashboard of the vehicle 210) configured to hold the mobile device. The mobile device 216 and/or vehicle 210 may detect whether the mobile device 216 is in the cradle using, for example, wired connections (e.g., if the mobile device 216 is plugged into the cradle), wireless connections (e.g., near-field communication (NFC), wireless charging, etc.), or presence sensors (e.g., light sensors on the mobile device 216 or cradle, which may be covered when the mobile device 216 is placed in the cradle). If the mobile device 216 is fixed by the cradle, the computing device may select the appropriate axis (or axes) to measure for acceleration, such as the x-axis, the y-axis, the z-axis, or a combination thereof. Each axis may use a different acceleration magnitude threshold for the purposes of determining a crash or non-crash event.

Returning to FIG. 3, in step 310, the computing device may determine a new acceleration magnitude threshold if the computing device determined in step 305 to update the threshold. The threshold may be updated in order to improve the accuracy of the crash detection algorithm, based on an analysis of crash and non-crash data collected from a plurality of mobile devices and/or from a plurality of vehicles. The threshold may also be updated based on the size of the vehicle 210. For example, a heavier vehicle (e.g., having a weight greater than a threshold, such as 4000 lbs.) may use a higher threshold to trigger a detection of a crash because heavier vehicles have more inertia and may experience larger force during a crash. A lighter vehicle (e.g., having a weight less than a threshold, such as 4000 lbs.) may use a lower threshold to trigger a detection of a crash because lighter vehicles have less inertia than heavier vehicles.

Exemplary, non-limiting acceleration magnitude thresholds include 3G, 4G, and 8G. In some aspects, the computing device may use multiple acceleration magnitude thresholds to determine the severity of the crash. For example, the computing device may be configured for three thresholds: 3G, 8G, and 60G. If the magnitude of acceleration is below 3G, the computing device may determine that a crash did not occur. If the magnitude of acceleration is between 3G and 8G, the computing device may determine that a minor crash occurred. If the magnitude of acceleration is between 8G and 60G, the computing device may determine that a moderate crash occurred. If the magnitude of acceleration is above 60G, the computing device may determine that a severe crash occurred. While the above example uses three thresholds, any number of thresholds (and thus levels of severity) may be used.

In some aspects, the threshold selected may depend on the configuration and capabilities of the accelerometer in the mobile device 216 or vehicle 210. For example, if the accelerometer is capable of measuring accelerations of up to +/−16G, the computing device may select any threshold value(s) less than 16G.

In step 315, the computing device may determine whether to update a time window. The time window may establish a period of time for which the computing device makes acceleration measurements for the purposes of determining a crash. The time window may be represented as a time value, such as 5 milliseconds. Alternatively, the time window may be represented as a number of acceleration measurements, such as 7 measurements, if the accelerometer makes periodic measurements (e.g., 125 measurements per second or 125 Hz). In the latter example, the time value for the time window may be 5.6 milliseconds (i.e., 7 measurements÷125 measurements/second). 125 Hz is merely exemplary, and other non-limiting examples include 90 Hz and 100 Hz. Other exemplary, non-limiting examples of the number of acceleration measurements include 3, 5, and 10 measurements. As will be described in further detail in the examples below, a computing device may determine whether the number of high magnitude acceleration measurements within the time window exceed a threshold number of acceleration measurements. In step 320, the computing device may determine a new time window if the computing device determined in step 315 to update the window. The time window may be updated in order to improve the accuracy of the crash detection algorithm, based on an analysis of crash and non-crash data collected from a plurality of mobile devices and/or from a plurality of vehicles. The time window may be increased to screen out noise or to observe multiple collisions that occur during a crash.

In step 325, the computing device may determine whether to update a threshold number of acceleration events. In step 330, the computing device may determine a new threshold number of acceleration events if the computing device determines to update the threshold in step 325. The threshold number of acceleration events may be used in combination with the acceleration magnitude threshold and time window previously described to determine whether a crash has occurred. For example, if the number of high magnitude acceleration events during the time window exceeds the threshold number of acceleration events, the computing device may determine that a crash occurred. Otherwise, the computing device may determine that a non-crash event occurred, such as the mobile device being dropped. In some aspects, the time window described above may be chosen to be long enough to distinguish the short duration of a dropped phone's impact with a surface from the longer duration of a vehicle crash. For example, the period of time may be greater than or equal to 5 milliseconds.

As previously described, each of the acceleration magnitude threshold, the time window, and/or the number of acceleration events threshold may be updated according to the steps illustrated in FIG. 3. The updated values may be sent as an update to an application on the mobile device 216 (e.g., in the case of a mobile deployment) or as a firmware update (e.g., in the case of a device deployment).

A brief, non-limiting example of a computing device using the acceleration magnitude threshold, time window, and number of acceleration events threshold will now be described. Assume that the acceleration magnitude threshold is 4G, time window is 5 measurements (or 4 milliseconds measured periodically at 125 Hz), and the number of acceleration events threshold is 3 measurements. The computing device may receive 5 acceleration measurements from the accelerometer during the time window and determine the magnitude of acceleration for each of the 5 measurements. If the magnitude of acceleration for at least 3 of the measurements exceeds 4G, the computing device may determine that a crash occurred. Otherwise, the computing device may determine that a non-crash event occurred, such as the phone being dropped or a hard braking event. Additional examples of crash detection will now be provided with reference to FIG. 4.

Figure 4:
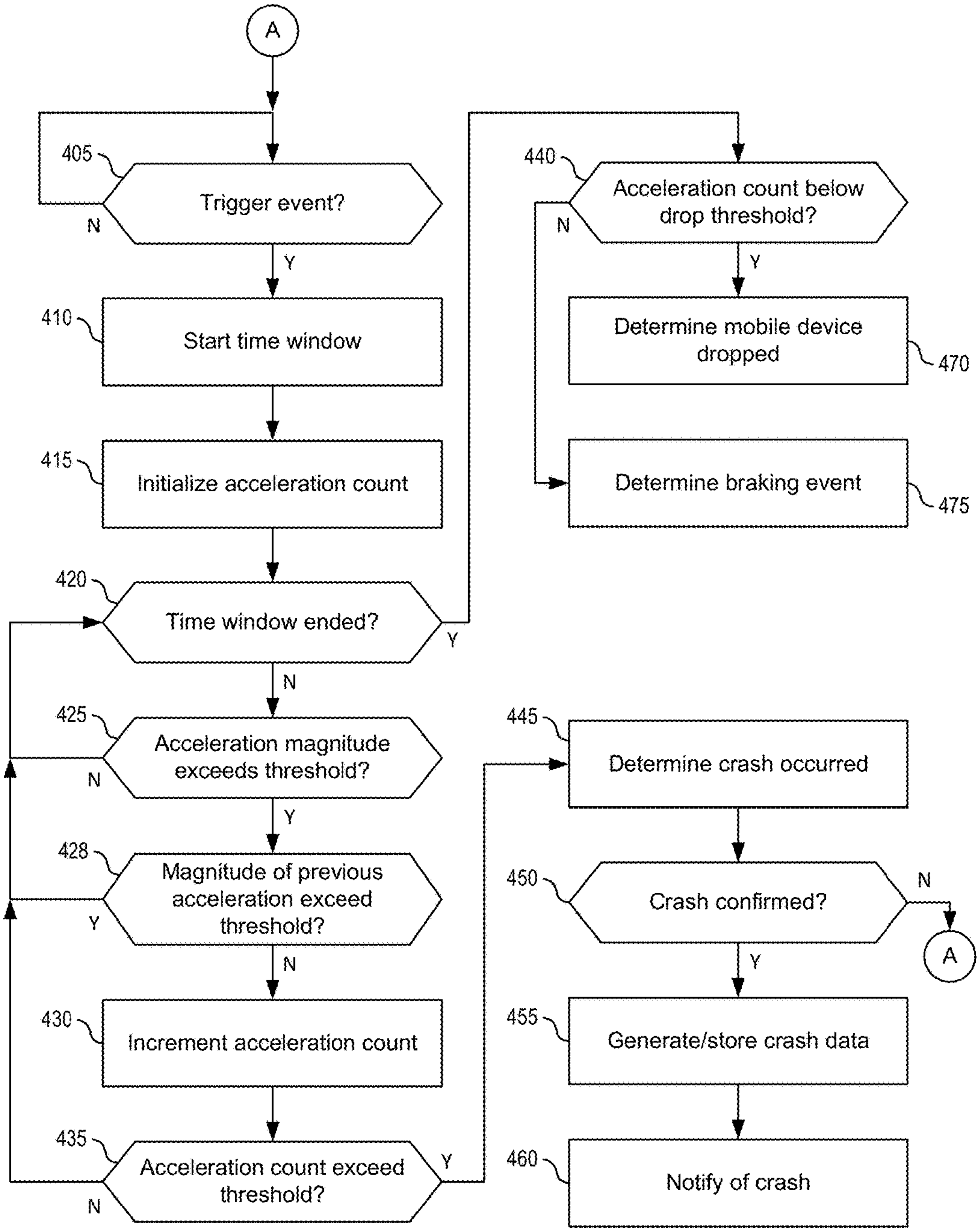
FIG. 4 is a flow diagram illustrating an example method of detecting a crash according to one or more aspects of the disclosure.

FIG. 4 is a flow diagram illustrating an example method of detecting a crash according to one or more aspects of the disclosure. The example of FIG. 4 may be performed by one or more computing devices in a crash detection system 200, such as vehicle computer 214, a crash detection computer 251, a mobile computing device 216, and/or other computer systems.

In step 405, a computing device may determine whether a trigger event has occurred. The trigger event may indicate the possibility of a crash, such as a magnitude of acceleration that exceeds an acceleration magnitude threshold. In some aspects, a threshold smaller than the acceleration magnitude threshold may be used to trigger the computing device to initiate detection of a crash. The trigger event may also be based on GPS measurements. For example, the computing device may determine that a trigger event has occurred if the change in speed measured by the GPS system of the mobile device 216 (or vehicle 210) is greater than a certain threshold. The computing device may wait for a trigger event before proceeding to step 410.

In step 410, the computing device may start the time window for taking acceleration measurements. As previously explained, the time window may comprise a time period and/or a number of measurements to take (e.g., if the acceleration measurements are periodically taken, such as every millisecond). The computing device may also initialize the time window to t=0 (the base time). In step 415, the computing device may initialize an acceleration count, which may be used to track the number of high acceleration events detected during the time window. The acceleration count may be initialized to 0 if the event that triggered the start of the time window is not included in the acceleration count, such as if the magnitude of the acceleration event trigger did not exceed the acceleration magnitude threshold or if the event is not otherwise to be counted. On the other hand, the acceleration count may be initialized to 1 if the magnitude of the acceleration event trigger exceeded the acceleration magnitude threshold or if the event is otherwise to be counted.

Instead of waiting for a trigger event (step 405) to trigger the time window (step 410) and to initialize the acceleration count (step 415), the computing device may use a rolling time window. Sensor data, such as acceleration data and/or GPS data, may be periodically made by and stored in, for example, the mobile device 216's memory. When a new sensor reading is made, the computing device may drop the oldest reading in the time window and add the new reading to the window.

In step 420, the computing device may determine whether the time window has ended. For example, if the time window is 5 milliseconds, the computing device may determine that the time window has ended when t=5 ms. If the time window is 5 measurements, the computing device may determine that the time window has ended when 5 measurements have been taken since the beginning of the time window.

If the time window has not ended (step 420: N), in step 425, the computing device may determine whether the magnitude of the acceleration for the currently sampled acceleration exceeds the acceleration magnitude threshold. For example, if the threshold is 4G and the magnitude of the current acceleration sample is 2.5G (step 425: N), the computing device may return to step 420 to determine whether the time window has ended and/or to take the next measurement. On the other hand, if the magnitude of the current acceleration sample is 4.6G (step 425: Y), the computing device may proceed to step 428.

In step 428, the computing device may optionally determine whether the previous acceleration sample (e.g., immediately previous acceleration sample) also exceeded the acceleration magnitude threshold. If the previous sample did not exceed the threshold (step 428: N), the computing device may proceed to step 430 and increment the acceleration count. On the other hand, if the previous sample exceeded the threshold (step 428: Y), the computing device might not increment the acceleration count and instead return to step 420. In other words, the computing device may optionally determine whether a crash has occurred based on the number of non-consecutive acceleration readings above the acceleration magnitude threshold. The computing device might not rely on consecutive acceleration samples. In other words, and as will be described below, the computing device may determine that a crash occurred based on either consecutive acceleration samples or non-consecutive acceleration samples.

In step 435, the computing device may determine whether the acceleration count within the time window has exceeded the number of acceleration events threshold. For example, if the threshold is two high magnitude acceleration events and the acceleration count is two (step 435: N), the computing device may return to step 420 to determine whether the time window has ended and/or to take the next measurement. On the other hand, if the acceleration count is three (step 435: Y), the computing device may proceed to step 445 and determine that a crash has occurred. The computing device may also determine that the mobile device is located within the vehicle involved in the crash. As previously explained, the computing device may determine the severity of the crash based on a plurality of acceleration magnitude thresholds. For example, if one, some, or all of the measured magnitudes exceeds a high threshold, the computing device may determine that a severe crash occurred. If one, some, or all of the magnitudes falls between a medium and high threshold, the computing device may determine that a moderate crash occurred. If one, some, or all of the magnitudes falls between a low and medium threshold, the computing device may determine that a minor crash occurred. If the mobile device 216 or vehicle computer 214 determines that a crash occurred in step 445, the device may generate a message indicating the crash and send the message to, for example, crash detection server 250.

In step 450, the computing device may confirm whether a crash occurred by analyzing additional data. In some aspects, the computing device may confirm the accident based on GPS readings. For example, the computing device may confirm the accident based on the change in speed of the vehicle 210 being greater than a threshold (e.g., indicating a hard stop or deceleration) and the GPS coordinates of the vehicle after the hard stop or deceleration falling within a certain radius of the location of the hard stop or deceleration for a particular length of time (e.g., thirty seconds).

A JavaScript Object Notation (JSON) algorithm may be used for crash determination and confirmation, as previously described. An exemplary JSON structure may be as follows:

```
{
  “gps”:{
    “deceleration”:0.33,
    “stop_def_radius”:50,
    “stop_wait_time: 30
  },
  “accelerometer”:{
    “window_length”:7,
    “breach_threshold”:5,
    “num_breaches”:3
  }
}
```

A JSON dictionary may include keys for “gps” and “accelerometer.” The following table illustrates the keys for “accelerometer”:

| Key | Definition |
|---|---|
| window_length | Number of x, y, and z acceleration readings considered (time window) |
| breach_threshold | Threshold for determining when the acceleration is considered high. Units may be G = 9.81 $m/s^2$ |
| num_breaches | Number of acceleration readings within the window for which the magnitude of acceleration exceeds the breach_threshold for a crash |

The following table illustrates the keys for “gps”:

| Key | Definition |
|---|---|
| deceleration | Threshold the difference in speed should be below. Units may be G = 9.81 $m/s^2$ |
| stop_def_radius | Radius a number of GPS readings after the hard deceleration should lie within. Units may be meters |
| stop_wait_time | Number of readings after the hard deceleration that should fall within the stop_def_radius. Units may be seconds |

The above JSON configuration example may be used to determine and confirm a crash in the following scenario. The GPS trail may show a magnitude of deceleration of 0.33G followed by the vehicle not moving more than 50 m in 30 s. Within an acceleration window of length 7 (e.g., a time value of 7/90 seconds for 90 Hz sampling) starting at the same time as the above GPS deceleration event, at least 3 of the 7 acceleration magnitude readings exceeds 5G.

Additionally or alternatively, the computing device may confirm (after detecting) the crash based on the location of the mobile device 216 and/or vehicle 210. For example, if the computing device determines that the mobile device 216 is on a road (or within a predetermined radius from a road), the computing device may confirm the crash. Otherwise, the computing device may determine that a crash did not occur. The location of the mobile device 216 and/or vehicle 210 may be determined using the location detection device 220, as previously described. The computing device may determine the existence of a road by accessing a database of maps, such as GPS or search engine maps. If the crash is not confirmed (step 450: N), the computing device may return to step 405 to determine whether another trigger event has occurred. If the crash is confirmed (step 450: Y), the computing device may proceed to step 455.

In step 455, the computing device may generate and/or store the crash data, such as the number of acceleration events counted, the severity of the crash, and the threshold values. The computing device may also generate and/or store the location of the crash, the time of the crash (including time zone), the identity of the vehicle (e.g., VIN, make/model, license plate number, etc.), the identity of the driver involved in the crash (e.g., name, customer number, driver's license number, etc.), and the identity of the mobile device 216 (e.g., IMEI, MAC address, IP address, etc.). For example, the time may be represented by a timestamp in the following format: YYYY-MM-DD HH:MM:SS -ZZZZ. -ZZZZ may stand for time zone offset from UTC (e.g., -0500 is Eastern Standard Time). In some aspects, the mobile device 216 may send the data to the crash detection server 250, which may store the data in database 252. The mobile device 216 may also send data for a number of seconds before and after the time window (e.g., 5 seconds before and 5 seconds after or 10 seconds before and 10 seconds after) to the crash detection server 250, and the data may be stored in database 252. By providing this data to the crash detection server 250, the server may be able to compare the before, during, and after values to confirm the crash. The crash detection server 250 may also use the stored information to make fast insurance claim determinations (relative to if the driver reports the crash days or weeks later), begin estimating vehicle damage costs faster at the First Notice of Loss (FNOL), and identify the location of accidents.

In step 460, the computing device may notify one or more individuals of the crash, via email, a telephone call, an on-screen pop-up, or any other communication medium. For example, the computing device may contact emergency personnel, such as local fire or police personnel. The message to the emergency personnel may include the location of the crash, the identity of the driver involved in the crash, the license plate number of the vehicle, the severity of the crash, and the like. The computing device may similarly send messages to other individuals, such as the driver's emergency contact identified in his or her profile stored in database 252. The computing device may also attempt to contact the driver or passenger of the vehicle involved in the crash. For example, the computing device may attempt to call the mobile device 216 or an onboard vehicle communication system in the vehicle 210. Additionally or alternatively, the computing device may provide emergency personnel with the phone number of the mobile device 216, which they may use to contact individuals in the vehicle.

Returning to step 420, the computing device may determine that the time window ended (step 420: Y), without the acceleration count exceeding the threshold number of acceleration events needed to determine that a crash occurred. In response, the computing device may determine that a non-crash event occurred, such as the mobile device 216 being dropped or a hard braking event. For example, if the mobile device 216 is dropped, the computing device might only detect one or two high magnitude events (compared to three or four for a crash). Accordingly, in step 440, the computing device may determine whether the number of high magnitude acceleration events falls below a mobile device drop threshold, such as two or three. If so (step 440: Y), the computing device may determine, in step 470, that the mobile device was dropped. The computing device may optionally return to step 405 to detect for additional trigger events and/or crashes. Otherwise, in step 475, the computing device may determine that a hard braking event occurred. The computing device may return to step 405 to detect for additional trigger events and/or crashes.

Figure 5:
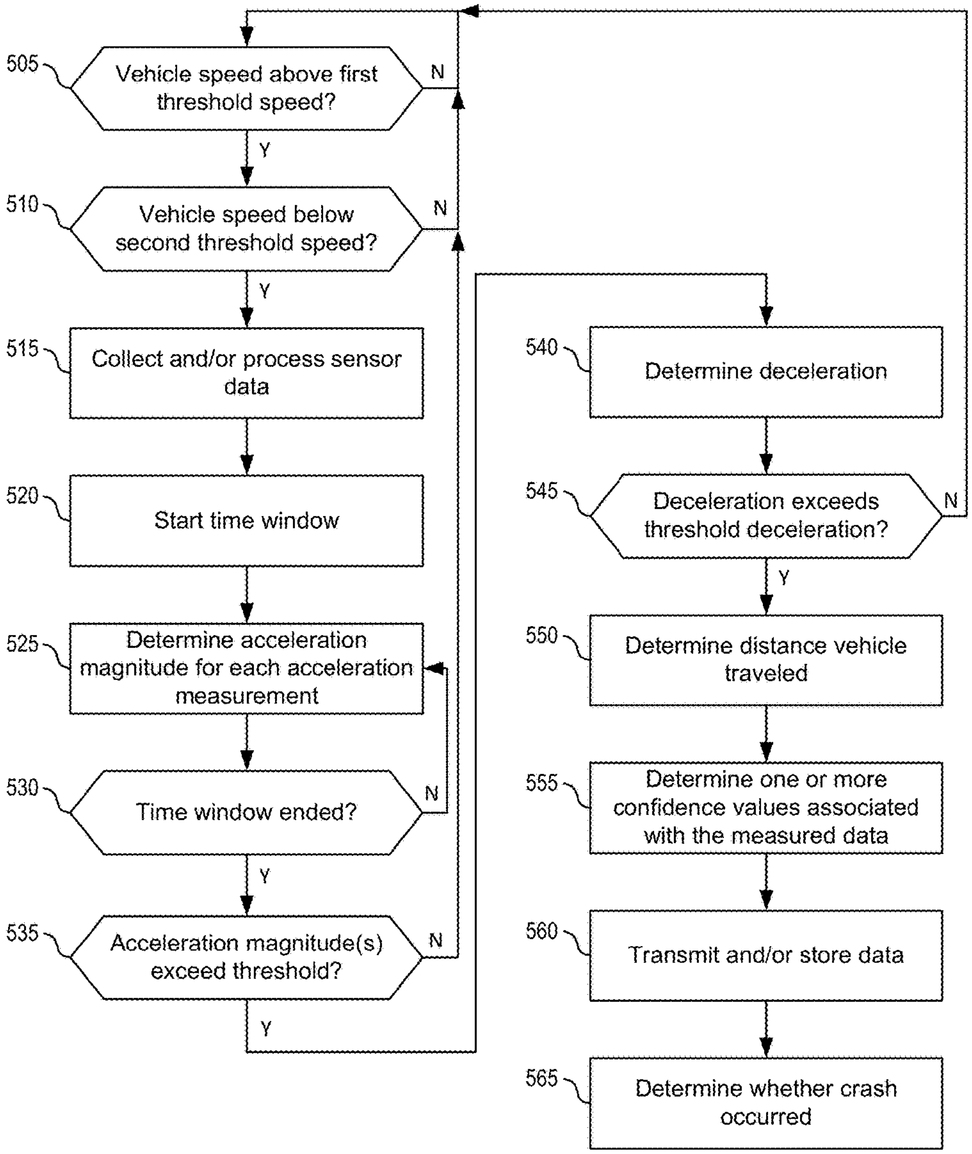
FIG. 5 is a flow diagram illustrating another example method of detecting a crash according to one or more aspects of the disclosure.

FIG. 5 is a flow diagram illustrating another example method of detecting a crash according to one or more aspects of the disclosure. One or more of the steps illustrated in FIG. 5 may be performed by one or more computing devices in a crash detection system 200, such as a mobile computing device 216. As previously explained, one or more software applications executing on the mobile computing device 216 may be configured to receive sensor data from sensors 218, such as acceleration, velocity, location, and the like and/or communicate with vehicle sensors 219 or other vehicle communication systems to sense or receive driving data. One or more of the software applications of the mobile computing device 216 may also be used to perform one or more of the steps illustrated in FIG. 5, such as determining acceleration magnitude, determine whether acceleration magnitude(s) exceed a threshold, determining deceleration rate, determining distance the vehicle traveled, determine confidence values, and the like, as will be described in further detail below.

For the sake of brevity, the steps will be described below as being performed by a mobile computing device. However, some of the steps may be performed by one or more other computing devices, such as vehicle computer 214, a crash detection computer 251, etc. One or more of the steps illustrated in the example of FIG. 5 may be performed to detect a crash or non-crash event.

In step 505, the mobile computing device may determine whether the vehicle's speed is above a threshold speed (e.g., a first threshold speed). The first threshold speed may be, for example, 20 miles per hour (MPH) or another speed. Some aspects described herein may be used to detect lower speed crashes. Moreover, use of the first threshold speed may advantageously be used to improve overall predictive performance and save processing resources by not processing data, such as acceleration data, during lower speed scenarios. As previously explained, one or more of the sensors 218 of the mobile computing device 216, such as a GPS sensor, may measure the speed of the mobile computing device 216 (and consequently the speed of the vehicle). Other sensors 218 of the mobile computing device 216 and/or sensors 219 of the vehicle 210 may be used to determine the vehicle's speed. If the vehicle's speed is below the first threshold speed (step 505: N), the mobile computing device may continue to monitor the vehicle's speed until its speed exceeds the first threshold speed. If, on the other hand, the vehicle's speed is above the first threshold speed (step 505: Y), the mobile computing device may proceed to step 510.

In step 510, the mobile computing device may determine whether the vehicle's speed is below a second threshold speed, which may be greater than the first threshold speed.

The second threshold speed may be, for example, 150 MPH or another speed. Use of the second threshold speed may advantageously be used to avoid confusing a car crash with, for example, airplane events (e.g., takeoffs and landings), which may occur at higher speeds. The second threshold speed may be used to detect the type of vehicle (e.g., a car or other land-based vehicle if the measured speed is below the second threshold speed or an airplane or other air-based vehicle if the measured speed is above the second threshold speed). If the vehicle's speed is above the second threshold speed (step 510: N), the mobile computing device may return to step 505 and continue to monitor the vehicle's speed until the vehicle's speed exceeds the first threshold speed and/or falls below the second threshold speed. If, on the other hand, the vehicle's speed is below the second threshold speed (step 510: Y), the mobile computing device may proceed to step 515. If there is a gap in speed data (e.g., GPS sensor data), such as in an urban canyon, prior speed data may be used to make the determination of whether the vehicle's speed is above a first threshold speed (e.g., in step 505) and/or below a second threshold speed (e.g., in step 510), such as for up to a threshold amount of time. If speed data (e.g., GPS sensor data) is not available for more than the threshold amount of time, the mobile computing device may proceed to step 515.

In step 515, the mobile computing device may collect and/or process sensor data. In some aspects, processing sensor data, such as acceleration data, when the vehicle's speed is within a particular range of speeds may advantageously save processing and/or memory resources compared to processing all of the sensor data, at all times. As previously described, sensor data may comprise accelerometer data, which may be measured by, for example, an accelerometer of the mobile computing device. The accelerometer may measure acceleration at a particular frequency or rate, such as 25 Hz, 50 Hz, 75 Hz, or another frequency. The accelerometer may measure acceleration along one or more axes, such as three different axes (e.g., x-axis, y-axis, and z-axis). The mobile computing device may also record a timestamp for each accelerometer measurement. The range of the accelerometer may be, for example, +/−8 Gs, +/−4 Gs, or any other range. Accelerometer measurements may also include a gravity component (e.g., 1G) acting in the direction of gravity, and the gravity component may be removed, as previously described.

The mobile computing device may collect other sensor data, such as location data, speed data, and/or time data. Location data may be collected from, for example, a GPS sensor (or other location sensor(s)) of the mobile computing device, as previously explained. In some aspects, location data and/or speed data may be measured at the same frequency or rate as the acceleration data or at a different frequency. For example, location data and/or speed data may be measured at 1 Hz or any other frequency.

In step 520, the mobile computing device may start a time window. As previously explained, the time window may comprise a period of time during which acceleration measurements are collected and/or processed to detect a crash event. In some aspects, the time window may be, for example, X seconds, less than X seconds, or more than X seconds. The time window may be updated, such as to improve the accuracy of crash detection, as previously described (e.g., by performing one or more of the steps illustrated in FIG. 3). In some examples, a time delay before starting the time window may be used to account for one or more braking events that may occur prior to a crash. For example, the time delay may be a particular length of time, such as 5 seconds, and the time delay may be measured starting at a point in time when the vehicle's speed exceeds the first threshold speed (e.g., 20 MPH), and/or the vehicle's speed is less than the second threshold speed (e.g., 150 MPH). The time delay may be between confirmation of the speed criteria (e.g., above a first threshold speed and below a second, higher threshold speed) and confirming the acceleration criteria in the time window. Various trigger events for starting the time window were previously described.

In step 525, the mobile computing device may determine an acceleration magnitude for each acceleration measurement. Each acceleration measurement may be made during the time window, such as by one or more accelerometer 218 of the mobile computing device 216. Various methods of determining the acceleration magnitude were previously described (e.g., sum of the absolute values of three axes of the accelerometer, sum of the squares of three axes, magnitude of a single axis, etc.). In some examples, the mobile computing device may calculate the magnitude of each acceleration measurement, as illustrated in the following algorithm:

$$(\text{accel\_}x^2+\text{accel\_}y^2+\text{accel\_}z^2)^{0.5}$$

An offset may be added to one of the axes (e.g., to account for the effect of gravity), as previously described. By using one or more of the algorithms for calculating acceleration magnitude, the mobile computing device might not need to be oriented to the vehicle's reference grid in order to measure acceleration and/or detect a crash (e.g., the crash detection algorithm(s) might be direction agnostic). Therefore, in some examples, the mobile computing device may be used to detect a crash (or other event) from a plurality of different orientations.

In step 530, the mobile computing device may determine whether the time window has ended. For example, if the time window is X seconds, the computing device may determine that the time window has ended when X seconds have passed since the start of the time window. As previously explained, the time window may comprise a time duration different from X seconds. In some examples, the mobile computing device may populate a queue (e.g., having a duration of X seconds) with the acceleration data for the time window. The mobile computing device may process that X seconds of data to calculate magnitude and/or the acceleration magnitude in the time window. In a loop, the mobile computing device may (a) wait a particular time duration (e.g., half the duration of the time window or X/2 seconds), (b) update the queue, such as by removing the old X/2 seconds of data and adding the newest X/2 seconds of data, and (c) process the next X seconds of data to calculate magnitude and/or the acceleration magnitude in the next time window. Other examples of determining whether the time window has ended and/or calculating acceleration magnitude(s) will be described in further detail below. If the time window has not ended (step 530: N), the mobile computing device may return to step 525 and continue to collect and process acceleration data, such as determine an acceleration magnitude for each acceleration measurement. If the time window has ended (step 530: Y), the mobile computing device may proceed to step 535.

In step 535, the mobile computing device may determine whether acceleration magnitude(s) measured during the time window exceed a threshold acceleration magnitude and/or may identify an acceleration magnitude from the acceleration magnitudes in a particular time window that satisfies a metric. As previously explained, the mobile computing device may determine whether a number of acceleration magnitudes exceeding a threshold acceleration magnitude exceeds a threshold number, such as two, three, four, or any other number. In some examples, within each window, the mobile computing device may calculate the minimum acceleration magnitude exceeded by a particular number or percentage (e.g., 40%, 50%, 60%, etc.) of points within the window. To convert the percentage of points to a number of points, the mobile computing device may scale the total number of the points in the window by the percentage (e.g., 50%) and round up to the nearest integer. The mobile computing device may use the median acceleration magnitude in the time window and compare it to a threshold magnitude. If two acceleration magnitudes are in the middle, the mobile computing device may use the higher value of the two or the lower value of the two. For example, if there are four acceleration measurements in the window, the mobile computing device may use the second highest acceleration magnitude and compare it to a threshold magnitude. If there are five acceleration measurements in the window, the mobile computing device may use the middle acceleration magnitude value and compare it to a threshold magnitude.

Figure 6:
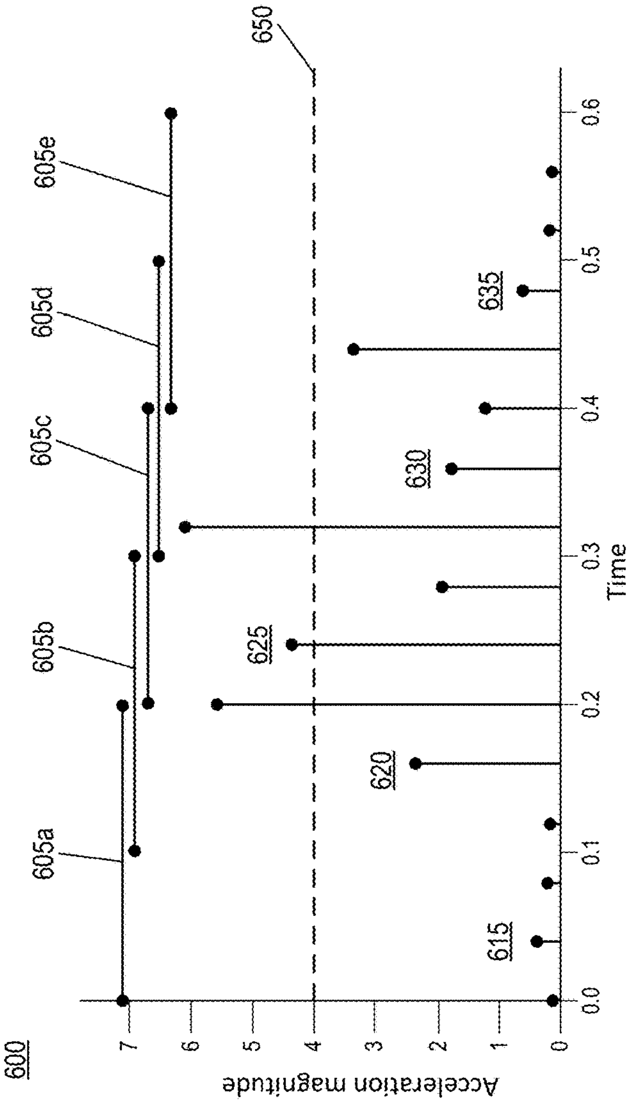
FIG. 6 is a diagram illustrating one or more use(s) of acceleration data according to one or more aspects of the disclosure.

FIG. 6 is a diagram 600 illustrating one or more use(s) of acceleration data according to one or more aspects of the disclosure. The diagram 600 includes a plurality of time windows 605*a-e*. In some aspects, the time windows 605*a-e* may comprise rolling evaluation windows. For example, the evaluation windows may be consecutive and may overlap the previous evaluation window by a certain amount of time or percentage. As illustrated in example 600, each time window 605*a-e* may be 0.2 seconds, and may overlap the previous time window by 0.1 seconds (e.g., 50% of the previous time window's duration) or any other predetermined amount of time or percentage. While FIG. 6 illustrates time windows having the same duration, the time windows may have one or more different durations. In some aspects, the endpoints of each time window may be inclusive and may include acceleration measurements made at one or both of the endpoints of the time window.

The diagram 600 illustrates a plurality of acceleration magnitudes measured within one or more time windows 605*a-e*. For example, the time window 605*a* may include six acceleration magnitudes, including acceleration magnitude 615 (e.g., 0.4G) and acceleration magnitude 620 (e.g., 2.3G). The time window 605*b* may include five acceleration magnitudes, including acceleration magnitude 620 and acceleration magnitude 625 (e.g., 4.3G). The time window 605*c* may include six acceleration magnitudes, including acceleration magnitude 625 and acceleration magnitude 630 (e.g., 1.8G). The time window 605*d* may include five acceleration magnitudes, including acceleration magnitude 630 and acceleration magnitude 635 (e.g., 0.5G). The time window 605*e* may include six acceleration magnitudes, including acceleration magnitude 635. The diagram 600 may also include a threshold acceleration magnitude 650 (e.g., 4G, 2G, or any other threshold). As previously explained, the threshold 650 may be modified, such as to achieve optimal performance.

As previously explained, the mobile computing device may calculate the minimum acceleration magnitude exceeded by a particular number or percentage of points within the window. For example, assume the percentage is 50%. In the first time window 605*a*, the mobile computing device may determine that the acceleration magnitude 615 corresponds to the minimum acceleration magnitude during the time window 605*a* for at least the $50^{th}$ percentile of points. As will be described in further detail below, the mobile computing device may compare the acceleration magnitude 615 to the threshold acceleration magnitude 650 to determine whether a crash occurred. Similarly, in the second time window 605*b*, the mobile computing device may determine that the acceleration magnitude 620 corresponds to the minimum acceleration magnitude during the time window 605*b* for at least the $50^{th}$ percentile of points. In the third time window 605*c*, the mobile computing device may determine that the acceleration magnitude 625 corresponds to the minimum acceleration magnitude during the time window 605*c* for at least the $50^{th}$ percentile of points. In the fourth time window 605*d*, the mobile computing device may determine that the acceleration magnitude 630 corresponds to the minimum acceleration magnitude during the time window 605*d* for at least the $50^{th}$ percentile of points. In the fifth time window 605*e*, the mobile computing device may determine that the acceleration magnitude 635 corresponds to the minimum acceleration magnitude during the time window 605*e* for at least the $50^{th}$ percentile of points, and so on.

Returning to FIG. 5, in step 535, the mobile computing device may identify an acceleration magnitude from the acceleration magnitudes in a particular time window that satisfies a metric, such as the minimum acceleration magnitude during the time window for at least the $X^{th}$ (e.g., $50^{th}$, $40^{th}$, $60^{th}$, etc.) percentile of points. For example, the mobile computing device may identify the median acceleration magnitude, the next acceleration magnitude above the median, the next acceleration magnitude below the median, etc. The mobile computing device may determine whether the identified acceleration magnitude exceeds the threshold magnitude. If not (step 535: N), the method may return to step 505 to monitor the speed of the vehicle and/or step 515 to collect and/or process more sensor data (e.g., for additional time windows, such as time window 605*b*, time window 605*c*, and so on). If, on the other hand, the identified acceleration magnitude during the time window exceeds the threshold (step 535: Y), the mobile computing device may proceed to step 540. For example, the mobile computing device may make an initial determination that a crash occurred, but may attempt to corroborate the crash based on additional sensor data.

In step 540, the mobile computing device may determine a deceleration value of the vehicle. The deceleration value may be used to corroborate or otherwise confirm the crash. In some aspects, the deceleration value may be derived from one or more sensors (e.g., a location or velocity sensor, such as a GPS sensor) different from the sensor(s) used to measure the acceleration values within each time window (e.g., an accelerometer). For example, the mobile computing device may receive, from the location or velocity sensor, a velocity of the vehicle $v_i$ at a first time $t_i$ and a velocity of the vehicle $v_{i+1}$ at a second time $t_{i+1}$ later than the first. The mobile computing device may calculate the deceleration as a first-order difference between the two points: $(v_{i+1}-v_i)/(t_{i+1}-t_i)$. The two points may be adjacent points.

Figure 7:
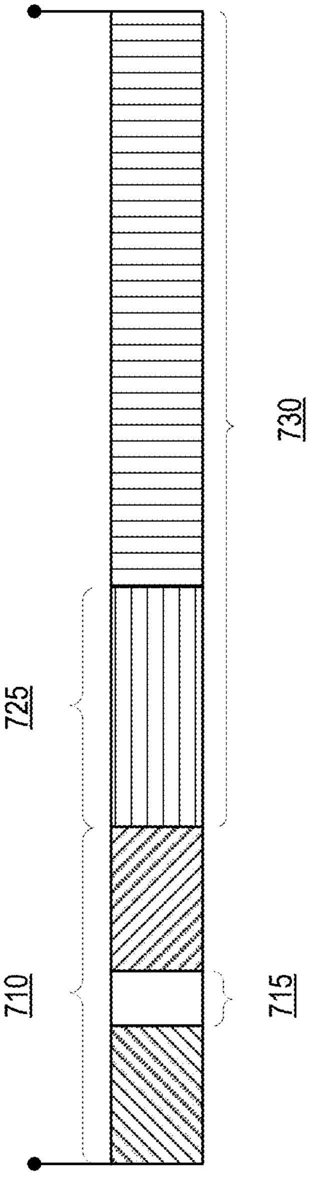
FIG. 7 is a diagram illustrating one or more time windows for collecting sensor data according to one or more aspects of the disclosure.

FIG. 7 is a diagram illustrating one or more time windows for collecting sensor data according to one or more aspects of the disclosure. In some aspects, the calculated deceleration may be the maximum deceleration measured within a particular span of time 710 that includes the start of the time window 715. For example, the span of time 710 used to measure deceleration may be from 3 seconds before the start of the time window 715 to 3 seconds after the start of the time window 715. As another example, the span of time 710 used to measure deceleration may be from 2.5 seconds before the start of the time window 715 to 3 seconds after the start of the time window 715. In these examples, the mobile computing device may calculate the deceleration as the maximum value of $|(v_{i+1}-v_i)/(t_{i+1}-t_i)|$, where the first time $t_i$ and the second time $t_{i+1}$ fall within the span of time 710 used to measure deceleration. In some aspects, if fewer than two data points (e.g., GPS data points) are available in the time span (e.g., due to a GPS gap), the mobile computing device may set the deceleration value to a predetermined value, such as −1 (e.g., to denote that alternative sensor data was not able to be used to corroborate or refute whether a crash had occurred).

Returning to FIG. 5, in step 545, the mobile computing device may determine whether the deceleration of the vehicle exceeds a threshold deceleration of the vehicle. If not (step 545: N), the mobile computing device may return to step 505 to monitor the speed of the vehicle and/or step 515 to collect and/or process more sensor data (e.g., for additional time windows, such as time window 605*b*, time window 605*c*, and so on). For example, the mobile computing device may determine the deceleration of the vehicle for other time windows. If the mobile computing device determines that the deceleration of the vehicle exceeds the threshold deceleration (step 545: Y), the mobile computing device may proceed to step 550. In some examples, GPS sensor data may be collected at a lower frequency than sensor data collected from accelerometer(s). In these examples, the threshold used for GPS derived deceleration (e.g., in steps 540 and/or 545) may be lower than the threshold used for accelerometer derived acceleration (e.g., in step 535). In some aspects, the mobile computing device may also proceed to step 550 if it set the deceleration value to a predetermined value (e.g., −1) and/or if data for calculating the deceleration value (e.g., GPS data) was not available.

In step 550, the mobile computing device may determine a distance that the vehicle traveled, which may be based on one or more locations of the vehicle. The distance the vehicle traveled may be used to corroborate or otherwise confirm the crash. For example, when a vehicle is involved in an accident, the vehicle may stop and/or occupant(s) of the vehicle may stop to exchange insurance information, investigate damage, or may be incapacitated. With reference to FIG. 7, the mobile computing device may analyze distance and/or location data for one or more time periods after the time span 710 for analyzing deceleration and/or after the time window 715 for analyzing accelerometer data. For example, the mobile computing device may determine the distance of travel during the time span 725 after the time span 710. The time span 725 may be, for example, a 15 second window. The mobile computing device may determine the distance of travel based on, for example, two location points received from the location sensor (e.g., a GPS sensor) of the mobile computing device. If the duration between the first and last points in the window 725 is less than a particular amount of time (e.g., 12 seconds), such as if there is a GPS gap at the start or end of the window, the mobile computing device may set the distance of travel during the window 725 to a predetermined value (e.g., −1), such as to indicate that distance in window 725 was not able to be ascertained accurately. If the trip ends before the time span 725 elapses, the mobile computing device may calculate the distance traveled as the distance between the end of the time span 710 and the last point (e.g., GPS point) before the trip end.

Additionally or alternatively, the mobile computing device may determine the distance of travel during the time span 730 after the time span 710. The time span 730 may be longer than the time span 725 and/or may include the time span 725. The time span 730 may be, for example, a 120 second window. The mobile computing device may determine the distance of travel based on, for example, two location points received from the location sensor (e.g., a GPS sensor) of the mobile computing device. If the duration of between the first and last points in the window 730 is less than a particular amount of time (e.g., 96 seconds), such as if there is a GPS gap at the start or end of the window, the mobile computing device may set the distance of travel during the window 730 to a predetermined value (e.g., −1), such as to indicate that distance in window 730 was not able to be ascertained accurately. If the trip ends before the time span 730 elapses, the mobile computing device may calculate the distance traveled as the distance between the end of the time span 710 and the last point (e.g., GPS point) before the trip end.

Returning to FIG. 5, in step 555, the mobile computing device may determine one or more confidence values associated with the measured data. For example, the mobile computing device may determine three confidence values, and two or more of the three confidence values may be combined to generate an overall confidence value. The confidence value(s) may be calculated as a function of one or more of the acceleration magnitude(s) (e.g., the minimum acceleration magnitude exceeded by a particular number or percentage of points within a time window, such as determined in steps 525 and/or 535), the deceleration of the vehicle (e.g., as determined in step 540 and/or 545), and/or the distance(s) the vehicle traveled (e.g., as determined in step 550). The confidence value(s) may indicate the likelihood that the vehicle was involved in a crash and to distinguish between different degrees of likelihood.

In some examples, a function for calculating a confidence $l_1$ based on the minimum acceleration magnitude $a_1$ exceeded by a percentage (e.g., 50%) of points within a set window may comprise a logistic regression model and may be calculated as follows:

$$l_1 = \frac{1}{1 + \exp(-(\beta_0 + \beta_1 a_1))}$$

In some examples, the parameters $\beta_0$ and $\beta_1$ may be trained on a data set comprising positive collisions (e.g., experimental collision testing, such as from a National Highway Traffic Safety Administration (NHTSA) vehicle crash test database, and/or instances of real collisions recorded by telematics sensors) and/or negative collisions (e.g., normal driving, instances of near-collision recorded by telematics sensors, instances of hard braking recorded by telematics sensors, instances of phone handling recorded by telematics sensors, etc.). The ratio of positive collision samples to negative collision samples may be varied, e.g., from one, two, three, or any other value, to verify the robustness of conclusions. The constitution of the positive and/or negative samples may be varied to give weight to specific samples. The samples may be filtered to represent different subsets of the available, e.g., collisions occurring at or above a certain speed.

In some examples, the parameters $\beta_0$ and $\beta_1$ may be further tuned based on the performance of the algorithm as applied to real world data. The performance may be assessed based on the overall rate of predicted collisions or the agreement between predicted collisions and actual collisions, where the latter may be attained by contacting the drivers of vehicles with predicted collisions and/or receiving indications of collisions from the drivers or other sources. For example, information indicating a collision may be received from a call center that is used to call people who have been in accidents. As another example, the driver or passengers may be able to provide information about a collision via an application, such as a mobile application on the mobile computing device.

A function for calculating a confidence $l_2$ based on the deceleration of the vehicle $a_2$ may be determined as a function of the minimum acceleration magnitude $a_1$ exceeded by a percentage (e.g., 50%) of points within a set window and the initial vehicle speed (e.g., as confirmed at steps 505 and/or 510).

$$l_2=f(a_2,a_1,v_1;\theta)$$

In some examples, the parameters θ may be trained on a data set comprising collision-like events that satisfy a threshold acceleration magnitude, such as described in reference to step 535.

In some examples, the parameters θ may be further tuned based on the performance of the algorithm as applied to real world data. The performance may be assessed based on the overall rate of predicted collisions or the agreement between predicted collisions and actual collisions, where the latter may be attained by contacting the drivers of vehicles with predicted collisions and/or receiving indications of collisions from the drivers or other sources. For example, information indicating a collision may be received from a call center that is used to call people who have been in accidents. As another example, the driver or passengers may be able to provide information about a collision via an application, such as a mobile application on the mobile computing device.

A function for calculating a confidence value $l_3$ based on the distance the vehicle traveled may be determined based on one or more of the distance traveled after a first time period (e.g., $T_1$ seconds) or the distance traveled after a second time period (e.g., $T_2$ seconds). The second time period may be greater than the first time period. For example, if the distance of travel after the second time period (e.g., $T_2$ seconds) is less than a threshold distance (e.g., $D_1$ meters), the mobile computing device may calculate a high confidence value (e.g., confidence value of $P_1$) associated with the distance of travel component. If the distance of travel after the first time period (e.g., $T_1$ seconds) is less than the threshold distance (e.g., $D_1$ meters), but the distance of travel after the second time period (e.g., $T_2$ seconds) is greater than the threshold distance (e.g., $D_1$ meters), the mobile computing device may calculate a medium confidence value (e.g., confidence value of $P_2$) associated with the distance of travel component. If the distance of travel after the first time period (e.g., $T_1$ seconds) is greater than the threshold distance (e.g., $D_1$ meters), the mobile computing device may calculate a low confidence value (e.g., confidence value of $P_3$) associated with the distance of travel component.

In some examples, the parameters $T_1$, $T_2$, $P_1$, $P_2$, $P_3$, and $D_1$ may be trained based on a data set comprising positive collisions and/or negative collisions (e.g., hard braking preceding a stationary period at a traffic light or intersection). The ratio of positive collision samples to negative collision samples may be varied, e.g., from one, two, three, or any other value to verify the robustness of conclusions.

In some examples, the parameters $P_1$, $P_2$, $P_3$, and $D_1$ may be trained to address a scenario where the distance after the first time period (e.g., $T_1$ seconds) can be calculated but the distance after the second time period (e.g., $T_2$ seconds) cannot be calculated (e.g., the data is not available). The parameters $P_1$, $P_2$, $P_3$, and $D_1$ may be trained to address a scenario where the distance after the second time period (e.g., $T_2$ seconds) can be calculated but the distance after the first time period (e.g., $T_1$ seconds) cannot be calculated (e.g., the data is not available). Or the parameters $P_1$, $P_2$, $P_3$, and $D_1$ may be trained to address a scenario where neither the distance after the first time period (e.g., $T_1$ seconds) nor the distance after the second time period (e.g., $T_2$ seconds) can be calculated.

The mobile computing device may determine an overall confidence value based on one or more of the confidence values associated with the acceleration magnitude(s), the deceleration of the vehicle, or the distance the vehicle traveled, such as follows:

$$l_{tot}=\frac{w_1l_1+w_2l_2+w_3l_3}{C}$$

In some examples, the parameters C, $w_1$, $w_2$ and/or $w_3$ may be tuned based on the performance of the algorithm, such as applied to real world data. The performance may be assessed based on the overall rate of predicted collisions or the agreement between predicted collisions and actual collisions, where the latter may be attained by contacting the drivers of vehicles with predicted collisions and/or receiving indications of collisions from the drivers or other sources. For example, information indicating a collision may be received from a call center that is used to call people who have been in accidents. As another example, the driver or passengers may be able to provide information about a collision via an application, such as a mobile application on the mobile computing device.

In step 560, the mobile computing device may transmit data to a server, such as the crash detection server 250. The mobile computing device may additionally or alternatively store data, such as locally at the mobile computing device. Event data fields may include contextual information like times, locations, distances, speeds, and accelerations associated with the possible crash event. Event data fields may be populated with one or more of the following values:

time window size time (e.g., based on a GPS clock) of last data point used for vehicle deceleration and/or distance of travel corroboration location at last data point, which may be used for vehicle deceleration and/or distance of travel corroboration signal strength of sensor (e.g., GPS) measurement, which may be an arbitrary value.

distance driven between two points in time (e.g., $T_2$ distance), which may be used for vehicle distance of travel corroboration; if $T_2$ distance is not available, the system may use $T_1$ distance; if neither distance is available, this may be set to none speed of initial point used to confirm vehicle speed (e.g., via GPS sensor data)

sensor detection method, which may be an arbitrary value rate of deceleration (e.g., maximum rate of deceleration) achieved during a span of time that includes the time window for determining acceleration magnitude, which may be based on GPS-derived acceleration rate time of point (e.g., GPS point) used to confirm initial speed location of point (e.g., GPS point) used to confirm initial speed predicted type of event, such as hard brake, vehicle crash, etc.

confidence level associated with crash event (e.g., confidence $l_1$, confidence $l_2$, confidence $l_3$, and/or total confidence, as previously described)

Each time there is an event, one or more of the above data may be sent, such as to the crash detection server 250. In the event of a crash, the mobile computing device may write sensor data (e.g., accelerometer data and GPS data) for a predetermined amount of time (e.g., 60 seconds) before and/or after the event. The data may be written to a location where the data can accessed by the application layer. Additionally or alternatively, the data may be transmitted from the mobile computing device to a server, such as the crash detection server 250. Examples of the data that the mobile computing device may transmit to the server were previously described. The data may be transmitted to the server within a threshold amount of time (e.g., 120 seconds) after the start of the window in which the acceleration threshold was exceeded. In some aspects, if multiple crash detection events occur within the same trip, the mobile computing device may send the data to the server once (e.g., as a package of data for the multiple crash events) or may send the data to the server multiple times (e.g., data for each crash event). The mobile computing device may store, in a buffer or other temporary storage location of the mobile computing device, a certain amount of data (e.g., the last 120 seconds of data, the last 150 seconds of data, etc.).

In step 565, the mobile computing device and/or the server may determine whether a crash occurred based on data. The mobile computing device and/or the server may determine whether a crash occurred based on one or more of the confidence values that indicate likelihood of a crash. If the confidence value exceeds a threshold confidence value, the mobile computing device and/or the server may determine that a crash occurred. If the confidence value does not exceed the threshold confidence value, the mobile computing device and/or the server may determine that a crash did not occur and that some other event occurred (e.g., a hard braking event, the mobile computing device was dropped, jerky movements, etc.). The confidence value(s) may also be displayed on one or more display devices, such as a display device of the mobile computing device, a display device associated with the server, etc.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A mobile computing device comprising:

an accelerometer configured to measure acceleration of at least one axis of the accelerometer;

communication circuitry configured to wirelessly communicate with other devices;

a processor; and memory storing computer-executable instructions that, when executed by the processor, cause the processor of the mobile computing device to:

receive, from the accelerometer, a plurality of acceleration measurements measured by the accelerometer during a time window comprising a predetermined duration;

determine, for each acceleration measurement of the plurality of acceleration measurements, a corresponding acceleration magnitude;

based on the corresponding acceleration magnitude for each acceleration measurement of the plurality of acceleration measurements, identify, from the plurality of acceleration measurements, an acceleration measurement having an acceleration magnitude that satisfies a metric;

determine whether the acceleration magnitude exceeds a threshold acceleration magnitude;

after determining that the acceleration magnitude exceeds the threshold acceleration magnitude, corroborate, based on sensor measurements different from the plurality of acceleration measurements, whether a vehicle associated with the mobile computing device was involved in a crash based on the acceleration magnitude of the identified acceleration measurement, determine a confidence value associated with whether the vehicle was involved in a crash; and transmit, via the communication circuitry and to a server, data indicative of the acceleration magnitude and data indicative of the sensor measurements.

2. The mobile computing device of claim 1, wherein the time window overlaps a previous time window by a predetermined amount of time.

3. The mobile computing device of claim 1, wherein each corresponding acceleration magnitude is determined based on a sum of squares of acceleration measurements for three axes of the accelerometer.

4. The mobile computing device of claim 1, wherein the metric comprises a predetermined percentile, and wherein the identifying the acceleration measurement having the acceleration magnitude that satisfies the metric comprises identifying, from the plurality of acceleration measurements, the acceleration measurement having a minimum acceleration magnitude in the predetermined percentile for the plurality of acceleration measurements.

5. The mobile computing device of claim 1, wherein the sensor measurements comprise deceleration data, and wherein the corroborating whether the vehicle was involved in a crash comprises determining whether a deceleration value calculated from the deceleration data exceeds a threshold deceleration.

6. The mobile computing device of claim 1, wherein the sensor measurements comprise location data, and wherein the corroborating whether the vehicle was involved in a crash comprises determining, based on the location data, whether a distance the vehicle traveled during one or more additional time windows after the time window exceeds a threshold distance.

7. The mobile computing device of claim 1, wherein the confidence value is determined based on the acceleration magnitude of the identified acceleration measurement and based on one or more of a deceleration value associated with the vehicle or a distance the vehicle traveled.

8. The mobile computing device of claim 1, wherein the determining, for each acceleration measurement of the plurality of acceleration measurements, the corresponding acceleration magnitude is performed in response to one or more of a determination that a speed associated with the vehicle is above a first threshold speed or a determination that the speed associated with the vehicle is below a second threshold speed.

9. A method comprising:

receiving, by a mobile computing device, a plurality of acceleration measurements measured by an accelerometer during a time window comprising a predetermined duration;

determining, by the mobile computing device and for each acceleration measurement of the plurality of acceleration measurements, a corresponding acceleration magnitude;

based on the corresponding acceleration magnitude for each acceleration measurement of the plurality of acceleration measurements, identifying, by the mobile computing device and from the plurality of acceleration measurements, an acceleration measurement having an acceleration magnitude that satisfies a metric;

determining, by the mobile computing device, whether the acceleration magnitude exceeds a threshold acceleration magnitude;

after determining that the acceleration magnitude exceeds the threshold acceleration magnitude, corroborating by the mobile computing device and based on sensor measurements different from the plurality of acceleration measurements, whether a vehicle associated with the mobile computing device was involved in a crash;

based on the acceleration magnitude of the identified acceleration measurement, determining, by the mobile computing device, a confidence value associated with whether the vehicle was involved in a crash; and transmitting, by the mobile computing device, via communication circuitry associated with the mobile computing device, and to a server, data indicative of the acceleration magnitude and data indicative of the sensor measurements.

10. The method of claim 9, wherein the time window overlaps a previous time window by a predetermined amount of time.

11. The method of claim 9, wherein each corresponding acceleration magnitude is determined based on a sum of squares of acceleration measurements for three axes of the accelerometer.

12. The method of claim 9, wherein the metric comprises a predetermined percentile, and wherein the identifying the acceleration measurement having the acceleration magnitude that satisfies the metric comprises identifying, from the plurality of acceleration measurements, the acceleration measurement having a minimum acceleration magnitude in the predetermined percentile for the plurality of acceleration measurements.

13. The method of claim 9, wherein the sensor measurements comprise deceleration data, and wherein the corroborating whether the vehicle was involved in a crash comprises determining whether a deceleration value calculated from the deceleration data exceeds a threshold deceleration.

14. The method of claim 9, wherein the sensor measurements comprise location data, and wherein the corroborating whether the vehicle was involved in a crash comprises determining, based on the location data, whether a distance the vehicle traveled during one or more additional time windows after the time window exceeds a threshold distance.

15. A non-transitory computer readable medium storing instructions that, when read by a processor of a mobile computing device, cause the processor of the mobile computing device to:

receive a plurality of acceleration measurements measured by an accelerometer during a time window comprising a predetermined duration;

determine, for each acceleration measurement of the plurality of acceleration measurements, a corresponding acceleration magnitude;

based on the corresponding acceleration magnitude for each acceleration measurement of the plurality of acceleration measurements, identify, from the plurality of acceleration measurements, an acceleration measurement having an acceleration magnitude that satisfies a metric;

determine whether the acceleration magnitude exceeds a threshold acceleration magnitude;

after determining that the acceleration magnitude exceeds the threshold acceleration magnitude, corroborate, based on sensor measurements different from the plurality of acceleration measurements, whether a vehicle associated with the mobile computing device was involved in a crash based on the acceleration magnitude of the identified acceleration measurement, determine a confidence value associated with whether the vehicle was involved in a crash; and transmit, via communication circuitry associated with the mobile computing device and to a server, data indicative of the acceleration magnitude and data indicative of the sensor measurements.

16. The non-transitory computer readable medium of claim 15, wherein the confidence value is determined based on the acceleration magnitude of the identified acceleration measurement and based on one or more of a deceleration value associated with the vehicle or a distance the vehicle traveled.

17. The non-transitory computer readable medium of claim 15, wherein the determining, for each acceleration measurement of the plurality of acceleration measurements, the corresponding acceleration magnitude is performed in response to one or more of a determination that a speed associated with the vehicle is above a first threshold speed or a determination that the speed associated with the vehicle is below a second threshold speed.

18. The non-transitory computer readable medium of claim 15, wherein the metric comprises a predetermined percentile, and wherein the identifying the acceleration measurement having the acceleration magnitude that satisfies the metric comprises identifying, from the plurality of acceleration measurements, the acceleration measurement having a minimum acceleration magnitude in the predetermined percentile for the plurality of acceleration measurements.

* * * * *